US012476404B2

(12) United States Patent
Kanematsu et al.

(10) Patent No.: US 12,476,404 B2
(45) Date of Patent: Nov. 18, 2025

(54) HIGH-VOLTAGE CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yuta Kanematsu, Mie (JP); Junichi Mukuno, Mie (JP); Yusuke Yamada, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 523 days.

(21) Appl. No.: 17/792,253

(22) PCT Filed: Jan. 21, 2021

(86) PCT No.: PCT/JP2021/001946

§ 371 (c)(1),
(2) Date: Jul. 12, 2022

(87) PCT Pub. No.: WO2021/149748

PCT Pub. Date: Jul. 29, 2021

(65) Prior Publication Data

US 2023/0079068 A1 Mar. 16, 2023

(30) Foreign Application Priority Data

Jan. 21, 2020 (JP) ................................ 2020-007746
Aug. 28, 2020 (JP) ................................ 2020-144901
Nov. 13, 2020 (JP) ................................ 2020-189174

(51) Int. Cl.
*H01R 13/05* (2006.01)
*H01R 13/115* (2006.01)
(Continued)

(52) U.S. Cl.
CPC ........... *H01R 13/05* (2013.01); *H01R 13/115* (2013.01); *H01R 13/502* (2013.01); *H01R 13/648* (2013.01); *H01R 13/26* (2013.01)

(58) Field of Classification Search
CPC .... H01R 13/422; H01R 13/05; H01R 13/115; H01R 13/502; H01R 13/648; H01R 13/26
See application file for complete search history.

(56) References Cited

U.S. PATENT DOCUMENTS 5,354,218 A * 10/1994 Fry ...................... H01R 13/422 439/595
8,277,265 B1 * 10/2012 Sykes .................... H01R 13/26 439/862

(Continued)

FOREIGN PATENT DOCUMENTS

JP S55-120088 U 8/1980
JP S60-112083 U 7/1985

(Continued)

OTHER PUBLICATIONS

International Search Report issued on Apr. 13, 2021 for WO 2021/149748 A1 (6 pages).

*Primary Examiner* — Renee S Luebke
*Assistant Examiner* — Paul D Baillargeon
(74) *Attorney, Agent, or Firm* — Venjuris, P.C.

(57) ABSTRACT

A high-voltage connector of a novel structure is disclosed which achieves an improvement in electrical conductivity, a reduced amount of heat generation and the like while realizing stable connection to a mating terminal by a simple structure having a small number of components. A high-
(Continued)

voltage connector 10 is provided with a terminal fitting 16 including a terminal body portion 34 in the form of a flat plate to be overlapped on a mating terminal 76 in the form of a flat plate in a plate thickness direction, and a resilient contact portion 38 integrally provided to the terminal body portion 34 and inclined to an overlapping side with the mating terminal 76.

12 Claims, 18 Drawing Sheets

(51) Int. Cl.

| | |
|---|---|
| ***H01R 13/502*** | (2006.01) |
| ***H01R 13/648*** | (2006.01) |
| *H01R 13/26* | (2006.01) |

(56) References Cited

U.S. PATENT DOCUMENTS

| | | | | |
|---|---|---|---|---|
| 9,972,932 | B2 * | 5/2018 | Copper | ................ H01R 13/113 |
| 2004/0266269 | A1 | 12/2004 | Miyazaki | |
| 2007/0218736 | A1 | 9/2007 | Takizawa et al. | |

FOREIGN PATENT DOCUMENTS

| | | | |
|---|---|---|---|
| JP | H05-307312 | A | 11/1993 |
| JP | H06-349538 | A | 12/1994 |
| JP | 2003-317821 | A | 11/2003 |
| JP | 2014-086152 | A | 5/2014 |
| JP | 2014-099370 | A | 5/2014 |
| JP | 2015-185204 | A | 10/2015 |

* cited by examiner

HIGH-VOLTAGE CONNECTOR

CROSS REFERENCE TO RELATED APPLICATIONS

This application is a national phase of PCT application No. PCT/JP2021/001946, filed on 21 Jan. 2021, which claims priority from Japanese patent application Nos. 2020-007746, 2020-144901 and 2020-189174 filed on 21 Jan. 2020, 28 Aug. 2020 and 13 Nov. 2020, respectively, all of which are incorporated herein by reference.

TECHNICAL FIELD

The present disclosure relates to a high-voltage connector.

BACKGROUND

A high-voltage connector including a tubular terminal to be externally fit to a mating terminal in the form of a flat plate constituted by a busbar or the like to enable stable connection to the mating terminal is widely used as a high-voltage connector used in hybrid vehicles, electric vehicles and the like. For example, a high-voltage connector including a tubular female terminal to be connected to a device-side terminal in the form of a flat plate as a mating terminal is shown in Patent Document 1.

PRIOR ART DOCUMENT

Patent Document

Patent Document 1: JP 2014-086152 A

SUMMARY OF THE INVENTION

Problems to be Solved

Since a device or the like, to which a high-voltage connector is connected, is relatively large in size, the position of a mating terminal varies due to a tolerance or the like on the device side and it may become difficult to connect the high-voltage connector to the mating terminal. Thus, in the high-voltage connector described in Patent Document 1, the female terminal and a wire are connected by a stretchable conductor and a structure is adopted which holds the female terminal displaceably with respect to a connector housing. In this way, even if the position of the mating terminal varies, the mating terminal and the female terminal can be reliably brought into contact by displacing the position of the female terminal by the deformation of the stretchable conductor.

However, a high-voltage connector including a tubular female terminal as described in Patent Document 1 is desired to realize low cost by simplifying a shape. Further, it is also required to deal with a request for size reduction by reducing an accommodation space for the terminal. Further, it is also technically significant to reduce the number of components and facilitate manufacturing by simplifying a structure in which the tubular female terminal is connected to the stretchable conductor constituted by a braided body of an electrically conductive wire material by crimping or the like. Further, it has been also required, such as, to realize an improvement in electrical conductivity and suppress heat generation by suppressing an electrical resistance, which increases in a connected part of the female terminal and the stretchable conductor.

Accordingly, a high-voltage connector of a novel structure is disclosed which achieves an improvement in electrical conductivity, a reduced amount of heat generation and the like while realizing stable connection to a mating terminal by a simple structure having a small number of components.

Means to Solve the Problem

The present disclosure is directed to a high-voltage connector with a terminal fitting including a terminal body portion in the form of a flat plate to be overlapped on a mating terminal in the form of a flat plate in a plate thickness direction, and a resilient contact portion integrally provided to the terminal body portion, the resilient contact portion being at least partially inclined to an overlapping side with the mating terminal, wherein the terminal fitting includes a fixing portion to be fixed to a connector housing having a terminal insertion hole into which the terminal body portion is inserted, a squeezable rib is provided to project from one of facing inner surfaces of the terminal insertion hole toward the other, and the terminal body portion is sandwiched and positioned between the squeezable rib and the other facing inner surface.

The present disclosure is also directed to a high-voltage connector with a terminal fitting including a terminal body portion in the form of a flat plate to be overlapped on a mating terminal in the form of a flat plate in a plate thickness direction; and a resilient contact portion integrally provided to the terminal body portion, the resilient contact portion being at least partially inclined to an overlapping side with the mating terminal, wherein the terminal fitting includes a fixing portion to be fixed to a connector housing having a terminal insertion hole into which the terminal body portion is inserted, the terminal fitting is so accommodated into the connector housing that the plate thickness direction of the terminal body portion is a vertical direction of the terminal insertion hole the terminal insertion hole has a flat rectangular shape and includes a pair of partition plates located in a central part in the vertical direction and projecting inward from both side surfaces, and a space located above the pair of partition plates serves as a mating terminal insertion portion, a space located below the pair of partition plates serves as a terminal body portion accommodating portion, and the resilient contact portion is arranged to project and be capable of contacting the mating terminal between facing surfaces of the pair of partition plates.

Effect of the Invention

According to the present disclosure, by a simple structure having a small number of components, an improvement in electrical conductivity, a reduced amount of heat generation and the like are achieved while stable connection to a mating terminal is realized.

DETAILED DESCRIPTION TO EXECUTE THE INVENTION

Description of Embodiments of Present Disclosure

Figure 1:
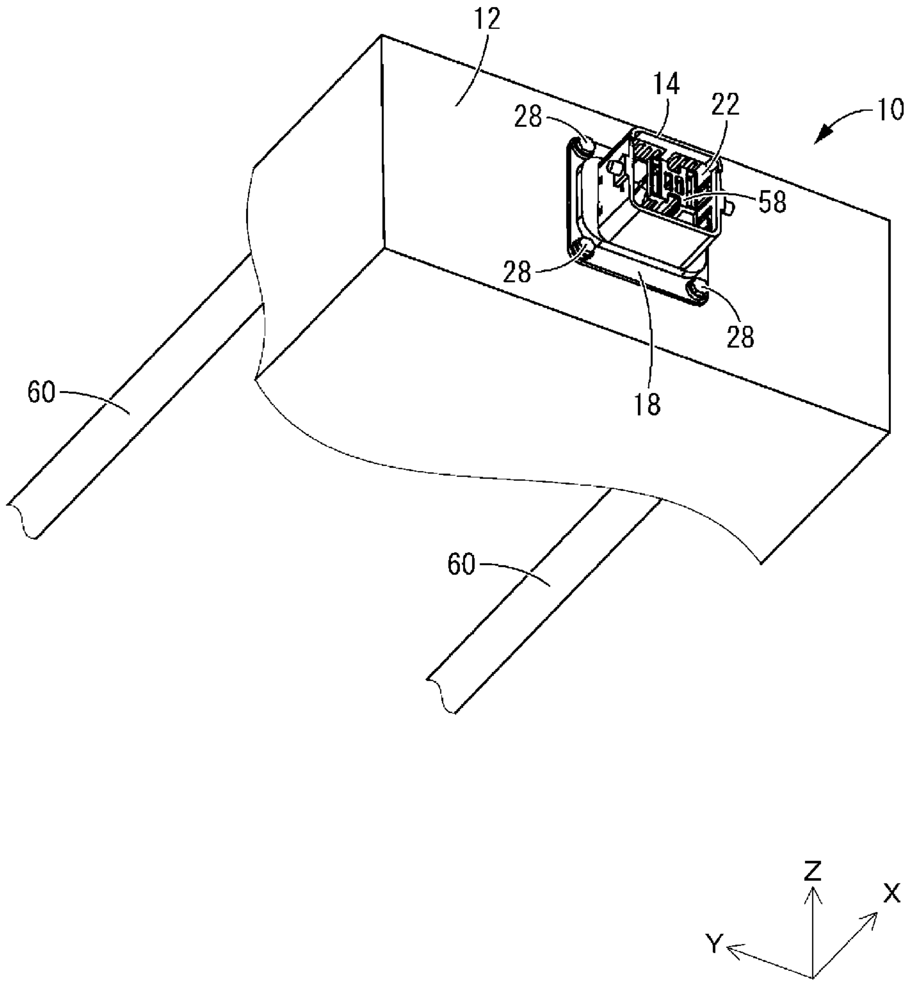
FIG. 1 is a perspective view of a high-voltage connector according to a first embodiment.

First, embodiments of the present disclosure are listed and described.

(1) The high-voltage connector of the present disclosure is provided with a terminal fitting including a terminal body portion in the form of a flat plate to be overlapped on a mating terminal in the form of a flat plate in a plate thickness direction, and a resilient contact portion integrally provided to the terminal body portion, the resilient contact portion being at least partially inclined to an overlapping side with the mating terminal, wherein the terminal fitting includes a fixing portion to be fixed to a connector housing having a terminal insertion hole into which the terminal body portion is inserted, a squeezable rib is provided to project from one of facing inner surfaces of the terminal insertion hole toward the other, and the terminal body portion is sandwiched and positioned between the squeezable rib and the other facing inner surface.

(2) Further, the high-voltage connector of the present disclosure is provided with a terminal fitting including a terminal body portion in the form of a flat plate to be overlapped on a mating terminal in the form of a flat plate in a plate thickness direction; and a resilient contact portion integrally provided to the terminal body portion, the resilient contact portion being at least partially inclined to an overlapping side with the mating terminal, wherein the terminal fitting includes a fixing portion to be fixed to a connector housing having a terminal insertion hole into which the terminal body portion is inserted, the terminal fitting is so accommodated into the connector housing that the plate thickness direction of the terminal body portion is a vertical direction of the terminal insertion hole, the terminal insertion hole has a flat rectangular shape and includes a pair of partition plates located in a central part in the vertical direction and projecting inward from both side surfaces, and a space located above the pair of partition plates serves as a mating terminal insertion portion, a space located below the pair of partition plates serves as a terminal body portion accommodating portion, and the resilient contact portion is arranged to project and be capable of contacting the mating terminal between facing surfaces of the pair of partition plates.

According to the high-voltage connector described in the present disclosure, since the terminal body portion constituting the terminal fitting is in the form of a flat plate, the shape of the terminal fitting is simpler as compared to a conventional tubular female terminal used for connection to a mating terminal in the form of a flat plate. Thus, a cost reduction is achieved. Further, an accommodation space for accommodating the terminal body portion can be reduced and the size reduction of the high-voltage connector can also be realized.

If the terminal body portion to be connected to the mating terminal in the form of a flat plate is in the form of a flat plate, a contact failure of the terminal body portion with the mating terminal easily occurs, but a stable contact with the mating terminal is maintained at the resilient contact portion provided in the terminal body portion in the high-voltage connector of the present disclosure. That is, the resilient contact portion has a part inclined in a direction projecting toward the mating terminal along the plate thickness direction of the terminal body portion, and this contact part is resiliently deformable to change an angle of inclination in the plate thickness direction. Therefore, a position variation of the mating terminal is absorbed by the resilient deformation of the resilient contact portion and a contact state of the mating terminal and the resilient contact portion is stably realized by pressing the resilient contact portion against the mating terminal.

Since the resilient contact portion is integrally provided to the terminal fitting, the contact failure as described above is avoided by a simple structure having a small number of components. Moreover, since the resilient contact portion has an integrated structure, a local increase in electrical resistance in a connected part as in the case of connecting two separate components is unlikely to occur, excellent electrical conductivity is realized and heat generation at the time of energization can also be suppressed.

(2) Preferably, the resilient contact portion is provided by cutting and raising in the terminal body portion. The resilient contact portion is provided by cutting and raising a part of the terminal body portion, whereby the resilient contact portion integrated with the terminal body portion can be easily provided. Further, the resilient contact portion is easily provided with an inclined part so that the resilient contact portion at least partially projects toward the mating terminal.

(3) Preferably, in (2) described above, the terminal body portion includes a frame-like portion constituting an outer peripheral end part and the resilient contact portion provided on an inner peripheral side of the frame-like portion via a slit, and the resilient contact portion is in the form of a leaf spring integrally coupled to the frame-like portion on a base end and resilient deformable in the plate thickness direction by being cut and raised to be cantilevered and inclined to the overlapping side with the mating terminal. In this way, the resilient contact portion provided by cutting and raising can be provided with a good yield and good durability.

(4) Preferably, in (2) or (3) described above, the resilient contact portion is provided with a first inclined portion inclined to the overlapping side with the mating terminal toward a tip of the terminal body portion, and a second inclined portion inclined to a side opposite to the overlapping side with the mating terminal toward the tip of the terminal body portion is provided on a side of the resilient contact portion closer to the tip than the first inclined portion.

According to this, the resilient contact portion is held in the contact state with the mating terminal based on the resilience of the first inclined portion. Further, by providing the second inclined portion on the side closer to the tip than the first inclined portion, the tip of the mating terminal abuts on the second inclined portion when the mating terminal is inserted from the tip side. In this way, the mating terminal is guided along the second inclined portion without being caught and can be inserted up to a proper position.

(5) Preferably, in (1) described above, the resilient contact portion is provided by folding on the tip of the terminal body portion. The resilient contact portion is provided by folding the terminal body portion on the tip, whereby the resilient contact portion integrated with the terminal body portion can be easily provided. Further, the resilient contact portion is easily provided with an inclined part so that the resilient contact portion at least partially projects toward the mating terminal. Further, the tip side of the terminal body portion is folded into a curved shape, whereby the mating terminal is unlikely to be caught on the tip of the terminal body portion when the mating terminal is inserted from the tip side and overlapped on the resilient contact portion.

(6) Preferably, in (5) described above, the terminal body portion includes a flat plate-like portion, a curved folded portion provided on a tip of the flat plate-like portion and the resilient contact portion extending from the folded portion toward a base end side, and the resilient contact portion is in the form of a leaf spring integrally coupled to the folded portion and resilient deformable in the plate thickness direction by being cantilevered and inclined to the overlapping side with the mating terminal. In this way, the resilient contact portion provided by folding can be provided with good manufacturability.

(7) Preferably, in (5) or (6) described above, the resilient contact portion is provided with a third inclined portion inclined to the overlapping side with the mating terminal toward a base end of the terminal body portion opposite to a folded side of the resilient contact portion, and a fourth inclined portion inclined to a side opposite to the overlapping side with the mating terminal toward the base end of the terminal body portion is provided on a side of the resilient contact portion closer to the base end of the terminal body portion than the third inclined portion.

According to this, a part of the resilient contact portion projecting to the overlapping side with the mating terminal is formed by the third inclined portion and the resilient contact portion is held in the contact state with the mating terminal. Further, by the presence of the third inclined portion, the tip of the mating terminal is guided in contact with the third inclined portion when the mating terminal is inserted from the tip side and overlapped on the resilient contact portion. Thus, the mating terminal is smoothly inserted up to a proper position without being caught. Further, since the fourth inclined portion is inclined to approach the terminal body portion toward the base end side of the terminal body portion, the fourth inclined portion comes into contact with the terminal body portion when the resilient contact portion is resiliently deformed, whereby a deformation amount of the folded portion, in other words, an angle change of the third inclined portion, is limited. Therefore, excessive deformation of the folded portion is prevented and the damage such as plastic deformation of the folded portion is avoided. In addition, in the contact state of the resilient contact portion and the mating terminal, an end part of the resilient contact portion on the base end side of the terminal body portion is arranged away from the mating terminal by the fourth inclined portion, and the damage and the like of the mating terminal caused by the contact of an edge of the resilient contact portion on the base end side of the terminal body portion are also prevented.

(8) Preferably, the terminal fitting includes a fixing portion to be fixed to a connector housing having a terminal insertion hole into which the terminal body portion is inserted. By fixing the terminal fitting to the connector housing, a swing and the like of the terminal body portion are reduced and a size reduction is achieved by a reduced accommodation space for accommodating the terminal body portion.

(9) Preferably, in (8) described above, an end part of a wire is connected to the terminal fitting at the fixing portion, and the high-voltage connector includes a fixing member for collectively fixing the fixing portion, the connector housing and the end part of the wire. Since the fixed position of the terminal fitting and the connector housing and the fixed position of the terminal fitting and the wire are substantially same, a moment acting on the terminal fitting by an input from the wire side is reduced, for example, when the input is transferred to the connector housing via the terminal fitting. Therefore, a swing, a positional deviation and the like of the terminal body portion in the terminal fitting are easily prevented.

(10) Preferably, in (8) or (9) described above, the terminal fitting is so accommodated into the connector housing that the plate thickness direction of the terminal body portion is a vertical direction of the terminal insertion hole. The terminal fitting can be so accommodated into the connector housing that the vertical direction of the terminal insertion hole of the connector housing is the plate thickness direction of the terminal body portion. Therefore, a height reduction of the connector housing itself can be advantageously achieved as compared to the case where the vertical direction of the terminal insertion hole of the connector housing is a plate width direction of the terminal body portion.

(11) Preferably, in (10) described above, the terminal insertion hole has a flat rectangular shape and includes a pair of partition plates located in a central part in the vertical direction and projecting inward from both side surfaces, and a space located above the pair of partition plates serves as a mating terminal insertion portion, a space located below the pair of partition plates serves as a terminal body portion accommodating portion, and a pair of the resilient contact portions are arranged to project and be capable of contacting the mating terminal between facing surfaces of the pair of partition plates. The terminal body portion can be accommodated and held in a state connectable to the mating terminal in a smaller space by a simple structure of providing the pair of partition plates projecting inward from the both side surfaces of the terminal insertion hole.

(12) Preferably, in (11) described above, the terminal body portion of the terminal fitting extends along an axial direction of the terminal body portion accommodating portion and the fixing portion of the terminal fitting extends downward in the vertical direction from a base end of the terminal body portion, and pressing ribs are provided on lower surfaces of the pair of partition plates, project toward a lower inner surface of the terminal body portion accommodating portion and press a tip part of the terminal body portion toward the lower inner surface. The terminal fitting is L-shaped by including the terminal body portion and the fixing portion extending downward from the base end of the terminal body portion. If the fixing portion is fixed to the connector housing, the tip part of the terminal body portion provided on a side opposite to the fixing portion of the L-shaped terminal fitting may be lifted up by a fixing force of the fixing portion and the connector housing. However, the tip part of the terminal body portion can be pressed toward the lower inner surface by the pressing ribs provided on the upper inner surface of the terminal insertion hole. In this way, the lift-up of the terminal body portion can be prevented, and the L-shaped terminal fitting can be stably positioned and held at a desired position with respect to the connector housing by the cooperation of the fixing portion and the pressing ribs.

(13) Preferably, in (8) or (9) described above, a squeezable rib is provided to project from one of facing inner surfaces of the terminal insertion hole toward the other, and the terminal body portion is sandwiched and positioned between the squeezable rib and the other facing inner surface.

According to this, the squeezable rib projecting toward the facing inner surface of the terminal insertion hole is appropriately squeezed by the terminal body portion, whereby a dimensional tolerance of the terminal insertion hole is allowed. Since the squeezable rib is provided to project only from either one of the facing inner surfaces of the terminal insertion hole toward the other, the terminal body portion is pressed against the other facing inner surface of the terminal insertion hole and stably positioned by the squeezable rib. By sandwiching and holding the terminal body portion between the squeezable rib and the other facing inner surface of the terminal insertion hole, a swing and the like of the terminal body portion are suppressed and, for example, the accommodation space for the terminal body portion can be reduced.

(14) Preferably, the terminal fitting is connected to an end of a wire without via a resilient deformable member. This is because, by providing the terminal body portion with the resilient contact portion, a stable contact state of the terminal body portion and the mating terminal can be realized by a simple structure having a small number of components even if a resiliently deformable member such as a braided body is not interposed between the terminal fitting and the end part of the wire as in a conventional structure.

(15) Preferably, the terminal body portion is surrounded by a shield member. This is because, in the high-voltage connector, the leakage of noise can be prevented while the size reduction and stable connection to a mating connector are realized.

Details of Embodiments of Present Disclosure

Specific examples of a high-voltage connector of the present disclosure are described below with reference to the drawings. Note that the present disclosure is not limited to these illustrations and is intended to be represented by claims and include all changes in the scope of claims and in the meaning and scope of equivalents.

First Embodiment

Hereinafter, a first embodiment of the present disclosure is described with reference to FIGS. 1 to 11. A high-voltage connector 10 is a high-voltage connector provided on the side of a device to be connected to a mating connector 74 (to be described later) provided on a power supply side in an unillustrated high-voltage wiring for supplying power from an unillustrated power supply such as a battery to the device such as an inverter or motor. Note that the orientation of the high-voltage connector 10 when installed in a vehicle is not limited. However, in the following description, an upward direction is a Z direction in FIG. 1, a forward direction is an X direction in FIG. 1, and a leftward direction is a Y direction in FIG. 1. Further, for a plurality of identical members, only some members may be denoted by a reference sign and the other members may not be denoted by the reference sign.

<High-Voltage Connector 10>

As shown in FIGS. 1 to 4, the high-voltage connector 10 is structured such that a pair of terminal fittings 16, 16 are mounted in a connector housing 14 to be fixed to a case 12 of the device such as an inverter. Note that a rear part of the case 12 is not shown in FIGS. 1 and 2 and the case 12 is not shown in FIGS. 3 and 4 for visibility and easy understanding.

<Connector Housing 14>

Figure 5:
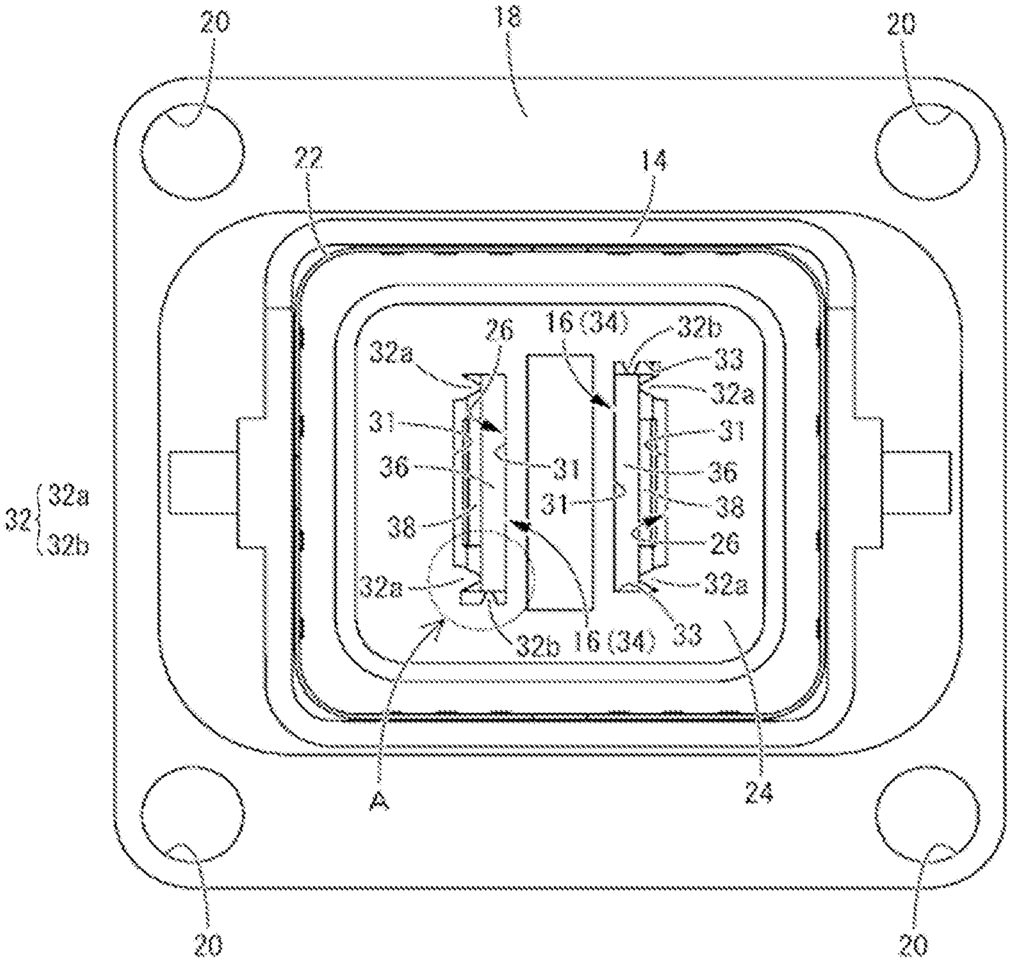
FIG. 5 is a front view showing disposed positions of terminal fittings in the high-voltage connector shown in FIG. 1.

The connector housing 14 is, for example, composed of an inner member made of electrically insulating synthetic resin or the like and an outer member made of metal and having the inner member inserted therein. The connector housing 14 is in the form of a bottomed rectangular tube with rounded corners open forward as a whole. The connector housing 14 includes a flange-like mounting piece 18 expanding radially outward on a rear end. Bolt holes 20 are formed to penetrate through four corners of the mounting piece 18. A tubular shield member 22 formed by a conductor such as a metal is inserted in the inner periphery of the connector housing 14. As shown in FIG. 5, a pair of terminal insertion holes 26, 26 penetrating in a front-rear direction are provided in a bottom surface 24 of the connector housing 14.

Figure 3:
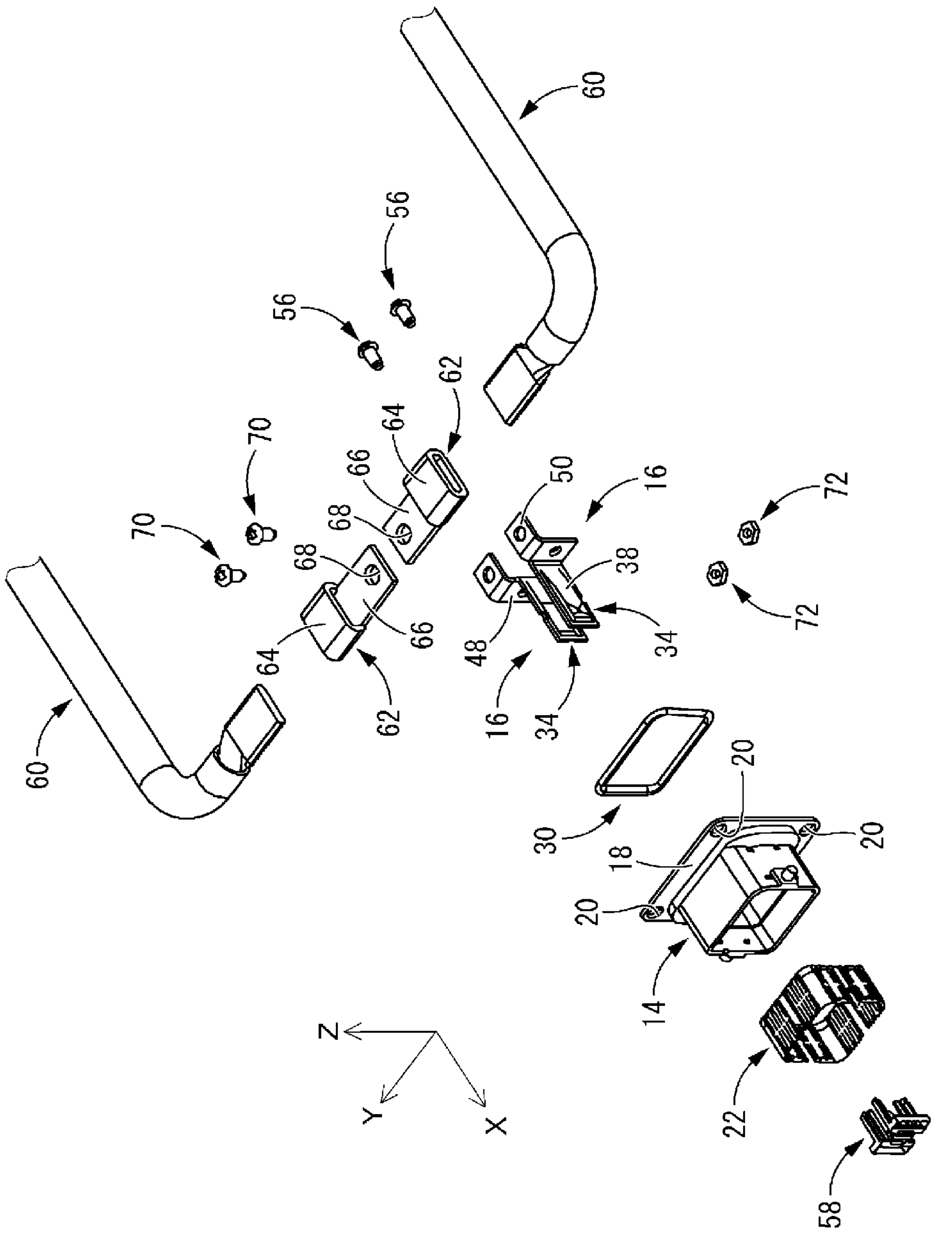
FIG. 3 is an exploded perspective view of the high-voltage connector shown in FIG. 1.
Figure 4:
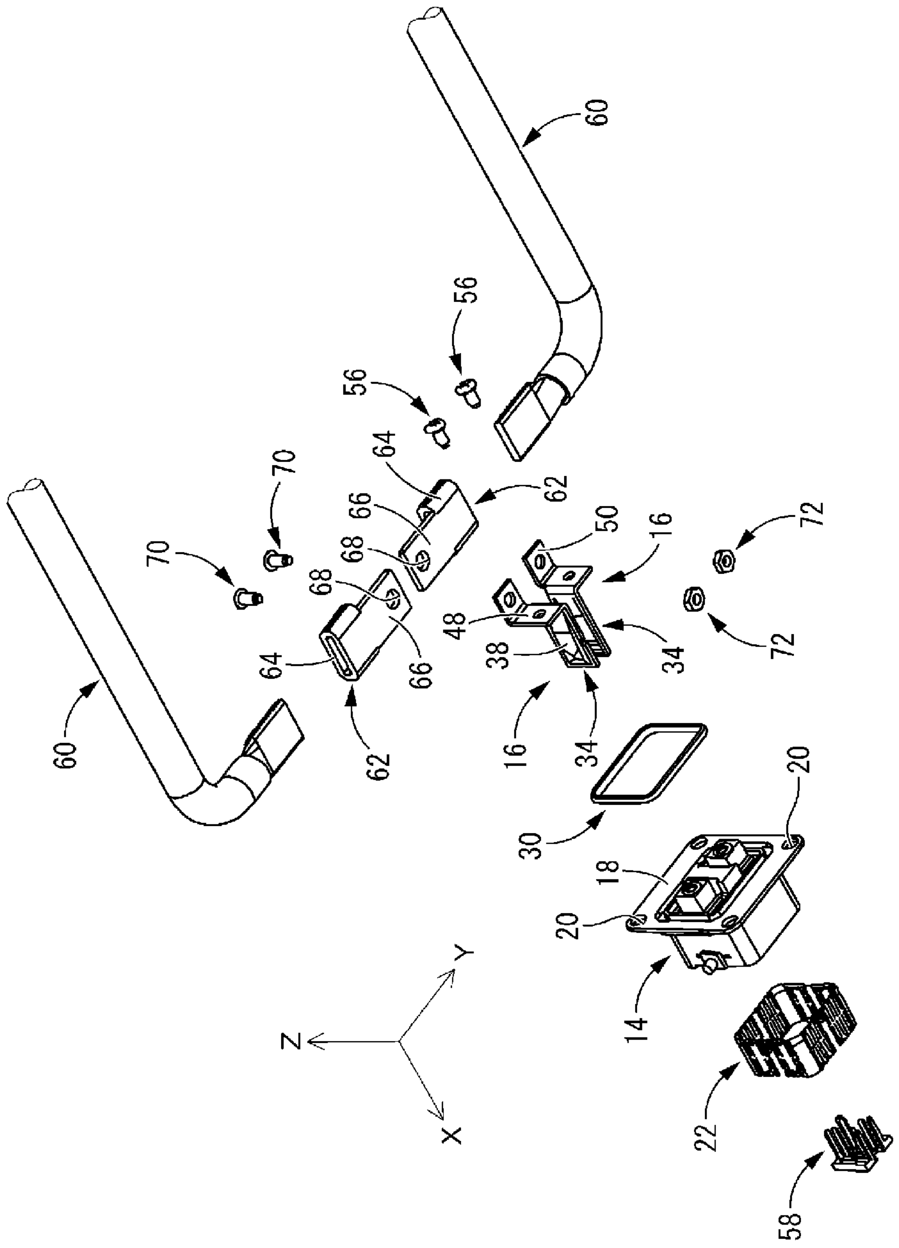
FIG. 4 is an exploded perspective view of the high-voltage connector shown in FIG. 1 when viewed from a direction different from that in FIG. 3.

As shown in FIG. 1, the connector housing 14 is fixed to the case 12 by bolts 28 inserted through the bolt holes 20 with the rear surface thereof overlapped on the case 12. As shown in FIGS. 3 and 4, a ring-shaped sealing rubber 30 is disposed between the rear surface of the connector housing 14 and the case 12, and liquid-tight sealing is provided between overlapping surfaces of the connector housing 14 and the case 12 by the sealing rubber 30.

<Squeezable Ribs 32>

Figure 6:
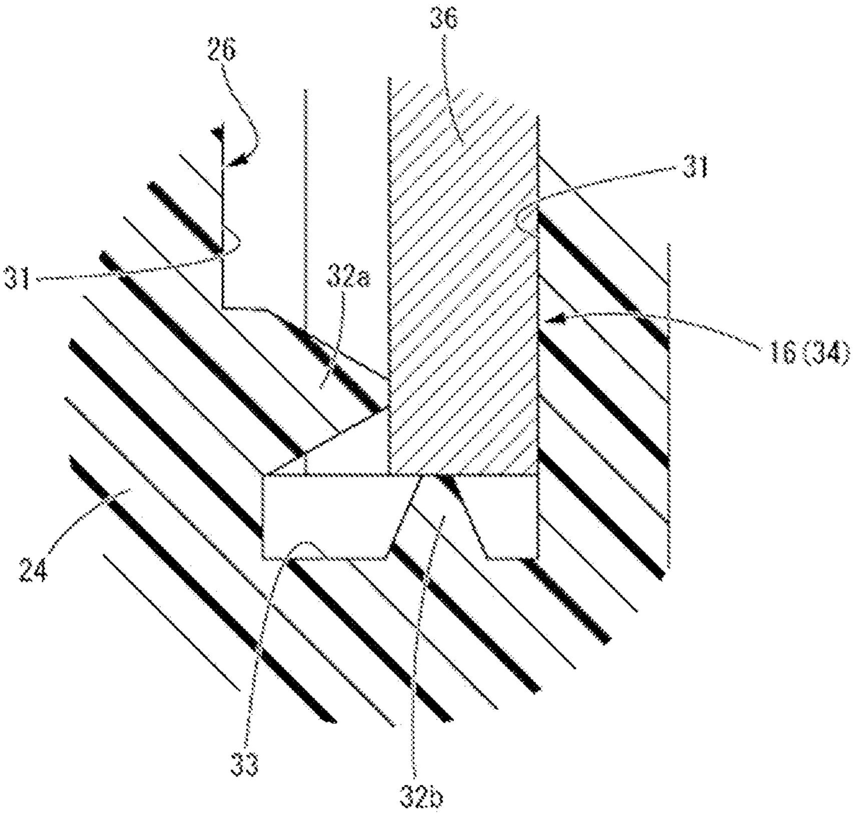
FIG. 6 is a front view enlargedly showing a part corresponding to A of FIG. 5.
Figure 7:
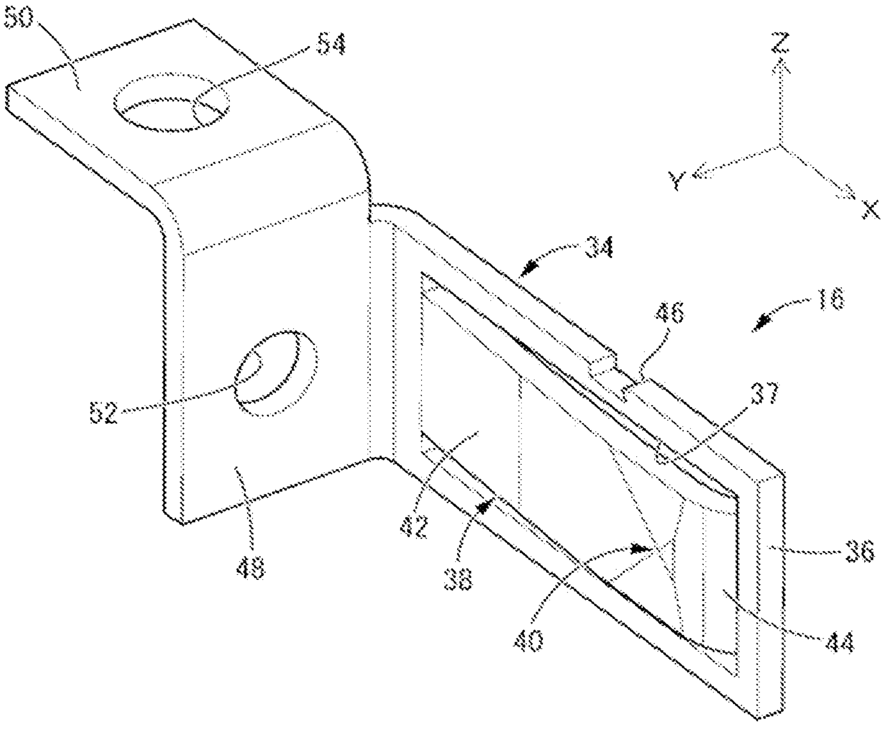
FIG. 7 is a perspective view of the terminal fitting constituting the high-voltage connector shown in FIG. 1.
Figure 8:
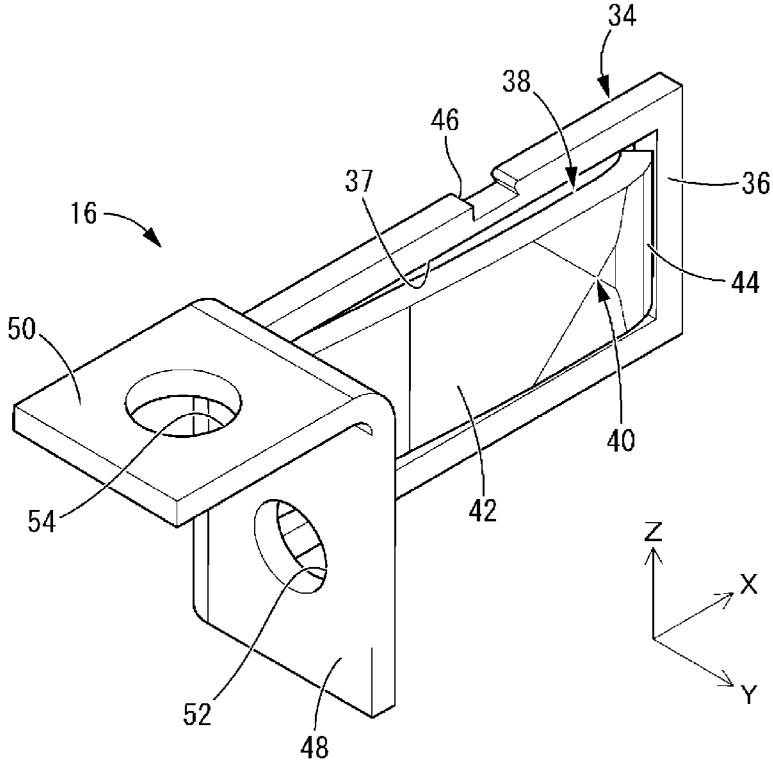
FIG. 8 is a perspective view showing the terminal fitting shown in FIG. 7 when viewed from another direction.
Figure 9:
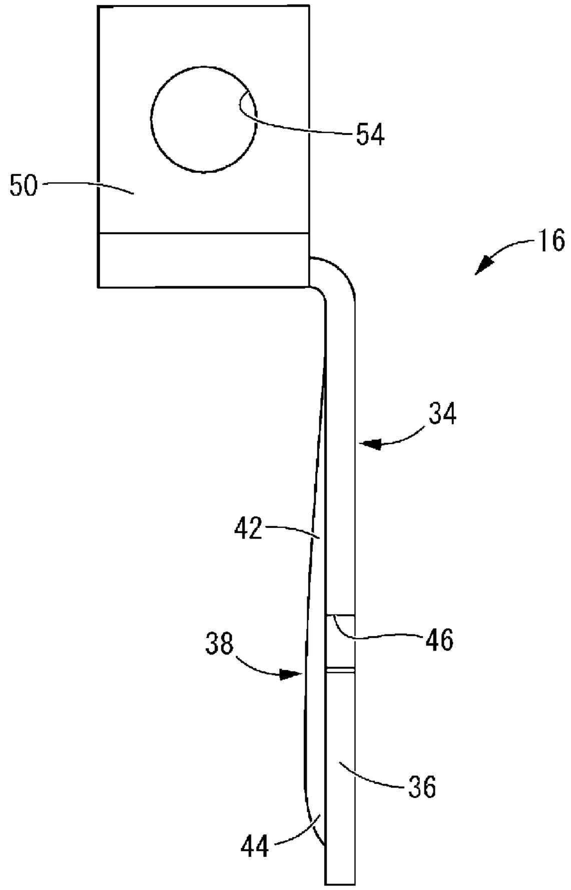
FIG. 9 is a plan view of the terminal fitting shown in FIG. 7.
Figure 10:
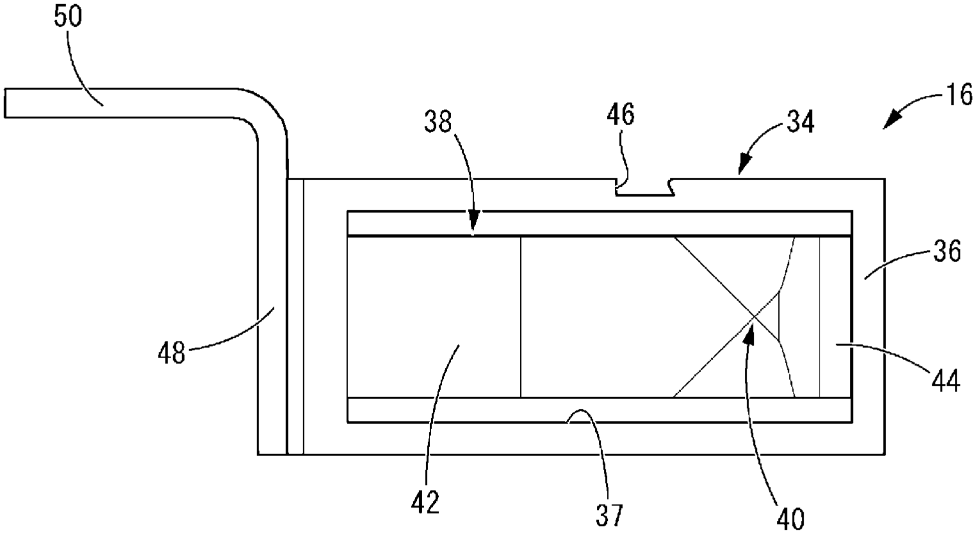
FIG. 10 is a left side view of the terminal fitting shown in FIG. 7.

As shown in FIGS. 5 and 6, squeezable ribs 32*a* projecting from one of facing inner surfaces 31, 31 facing each other in a lateral direction toward the other and a squeezable rib 32*b* projecting from one of facing inner surfaces 33, 33 facing each other in a vertical direction toward the other are provided on the inner periphery of each terminal insertion hole 26. The squeezable ribs 32 project in the lateral direction or vertical direction and have a tapered shape narrowed toward a projecting tip. The squeezable ribs 32*a* of the terminal insertion hole 26 projecting in the lateral direction are respectively provided in both end parts in the vertical direction of the terminal insertion hole 26.

<Terminal Fittings 16>

The terminal fitting 16 is formed of an electrically conductive metal material. As shown in FIGS. 7 to 10, the terminal fitting 16 includes a terminal body portion 34 in the form of a flat plate. The terminal body portion 34 includes a frame-like portion 36 constituting an outer peripheral end part and a resilient contact portion 38 provided on an inner peripheral side of the frame-like portion 36 via a slit 37. The resilient contact portion 38 is formed by partially cutting and raising a metal plate constituting the terminal body portion 34, and integrally connected to the frame-like portion 36 on a base end. The resilient contact portion 38 is in the form of a leaf spring resiliently deformable in a plate thickness direction by being cut and raised to be cantilevered and inclined to an overlapping side with a mating terminal 76 to be described later, and allowed to tilt in the plate thickness direction with respect to the frame-like portion 36 by resilient deformation. A slit 37 formed between the frame-like portion 36 and the resilient contact portion 38 extends while surrounding the resilient contact portion 38 on three sides including a front side and both upper and lower sides. In this way, the resilient contact portion 38 provided by cutting and raising can be provided with a good yield and good durability.

The resilient contact portion 38 is at least partially inclined outward in the lateral direction (lateral direction in FIG. 9), which is the plate thickness direction, from a rear end (left end in FIG. 10) as the base end connected to the frame-like portion 36 toward a front end (right end in FIG. 10) as a tip formed as a free end by the slit 37. In this way, the resilient contact portion 38 projects outward in the lateral direction to the overlapping side with the mating terminal 76 to be described later with respect to the frame-like portion 36.

A top part 40 of the resilient contact portion 38 where a projecting amount in the plate thickness direction from the frame-like portion 36 is maximum is set at an intermediate position between the rear end and the front end. The resilient contact portion 38 includes a first inclined portion 42 inclined to the overlapping side with the mating terminal 76 in the plate thickness direction from the rear end toward the top part 40, and a projecting mount of the resilient contact portion 38 from the frame-like portion 36 in the plate thickness direction gradually increases from the rear end toward the top part 40. Further, the resilient contact portion 38 includes a second inclined portion 44 inclined to a side opposite to the overlapping side with the mating terminal 76 from the top part 40 toward the front end, and the projecting amount of the resilient contact portion 38 from the frame-like portion 36 in the plate thickness direction gradually decreases from the top part 40 toward the front end. The top part 40 of the resilient contact portion 38 is a convex spot and projects more with respect to the frame-like portion 36.

The frame-like portion 36 includes a recessed groove 46. The recessed groove 46 is provided open in the upper or lower surface of the frame-like portion 36 and penetrates through the frame-like portion 36 in the lateral direction. The inner surface of a front side wall in the recessed groove 46 has an overhanging structure to be inclined forward with distance from an opening on a vertical side. The inner surface of the front side wall in the recessed groove 46 may have, for example, a stepped shape to be narrower in a part near the opening than in a part distant from the opening.

A fixing portion 48 and a wire connecting portion 50 are provided behind the terminal body portion 34. The fixing portion 48 is provided to be continuous with the rear end of the terminal body portion 34, extends orthogonally to the terminal body portion 34 and includes a bolt hole 52 penetrating in the front-rear direction. The wire connecting portion 50 is provided to be continuous with the rear end of the fixing portion 48, extends orthogonally to both the terminal body portion 34 and the fixing portion 48 and includes a bolt hole 54 penetrating in the vertical direction.

Note that, since the pair of terminal fittings 16, 16 are shaped plane-symmetrically in the lateral direction, one terminal fitting 16 shown in FIGS. 7 to 10 is described, but the other terminal fitting 16 is not described. Further, the recessed groove 46 of the one terminal fitting 16 is provided open in the upper surface of the frame-like portion 36, and the recessed groove 46 of the other terminal fitting 16 is provided open in the lower surface of the frame-like portion 36. As also understood from this, the plane-symmetrical shapes of the pair of terminal fittings 16, 16 are not strictly limited to mathematically symmetrical shapes, but can be regarded as plane-symmetrical shapes even if these shapes are slightly different.

Figure 2:
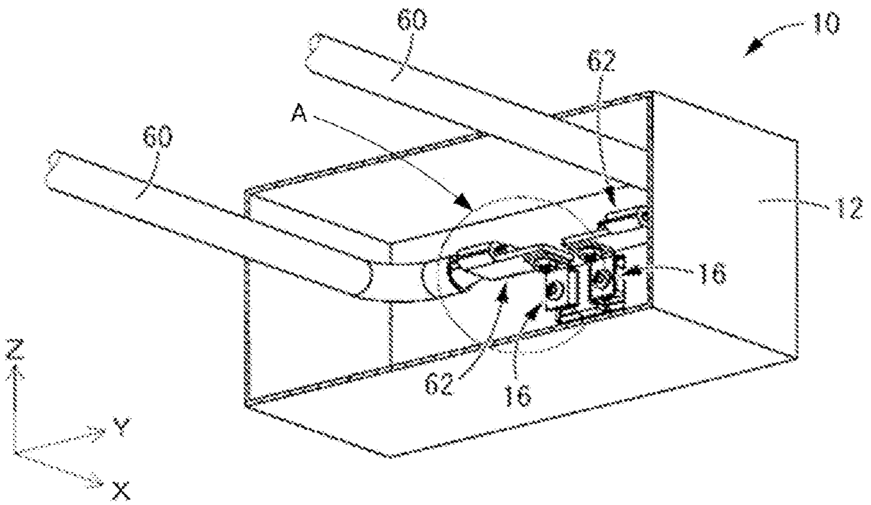
FIG. 2 is a perspective view showing the high-voltage connector shown in FIG. 1 when viewed from another direction.
Figure 2A:
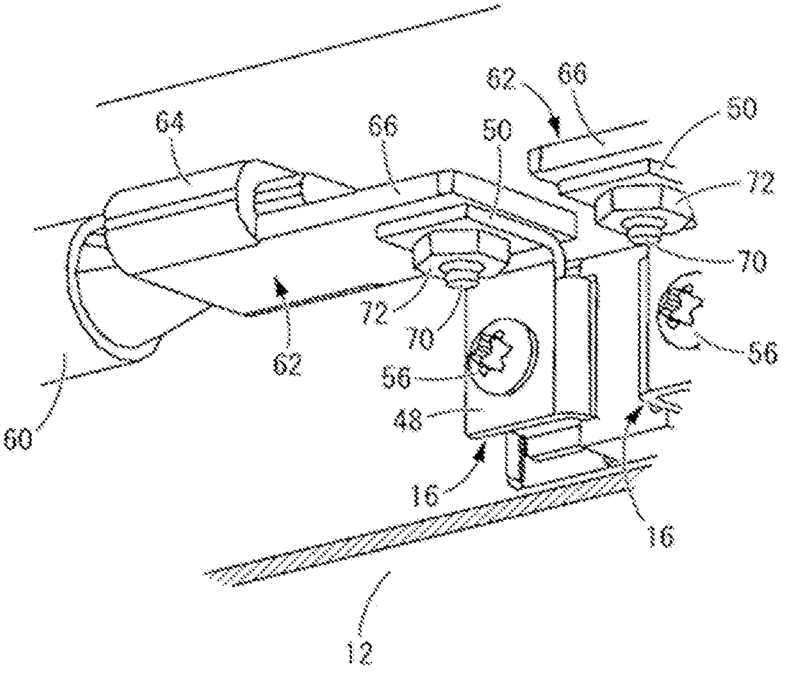
FIG. 2A is a perspective view enlargedly showing a part corresponding to A of FIG. 2.

As shown in FIG. 2, the terminal fitting 16 is fixed to the connector housing 14 by fixing the fixing portion 48 overlapped on the rear surface of the connector housing 14 to the connector housing 14 by a bolt 56 inserted through the bolt hole 52. By fixing a rear part of the terminal fitting 16 to the connector housing 14 in this way, the terminal body portion 34 is positioned with respect to the connector housing 14 and a displacement such as a swing of the terminal body portion 34 is suppressed. Therefore, a surrounding space taking into consideration the swing and the like of the terminal body portion 34 can be drastically made narrower than in a conventional female terminal supported by a braided body or the like, and the high-voltage connector 10 can be reduced in size. Note that a method for fixing the fixing portion 48 to the connector housing 14 is not particularly limited.

The terminal body portion 34 of the terminal fitting 16 is inserted into the terminal insertion hole 26 provided in the connector housing 14 and projects forward in the inner periphery of the connector housing 14. As shown in FIGS. 5 and 6, the squeezable ribs 32 provided to project in the lateral direction from one facing inner surface 31 of the terminal insertion hole 26 are pressed against a rear end part of the terminal body portion 34 inserted into the terminal insertion hole 26. In this way, the rear end part of the terminal body portion 34 is sandwiched in the lateral direction between the squeezable ribs 32 and the other facing inner surface 31. Further, the squeezable rib 32 provided to project in the vertical direction from one facing inner surface 33 of the terminal insertion hole 26 is pressed against the rear end part of the terminal body portion 34 inserted into the terminal insertion hole 26. In this way, the rear end part of the terminal body portion 34 is sandwiched in the vertical direction between the squeezable rib 32 and the other facing inner surface 33.

In inserting the terminal body portion 34 into the terminal insertion hole 26, the squeezable ribs 32 are appropriately squeezed, whereby position variations of a fastened part of the terminal fitting 16 by the bolt 56 and the terminal insertion hole 26 are allowed and the terminal fitting 16 is easily mounted into the connector housing 14. Further, the terminal body portion 34 is positioned in the lateral direction and vertical direction on a front side with respect to the connector housing 14, a displacement and the like of the terminal body portion 34 are further suppressed, and the saving of an accommodation space, a stable connected state to the mating terminal 76 and the like are achieved.

The terminal body portion 34 projecting in the inner periphery of the connector housing 14 is surrounded by the shield member 22 covering the inner peripheral surface of the connector housing 14. In this way, the leakage of noise is prevented and, for example, an influence on surrounding electric circuits and the like is prevented in the high-voltage connector 10 constituting the high-voltage wiring.

<Electric Shock Prevention Cap 58>

An electric shock prevention cap 58 is mounted on the terminal body portion 34 projecting into the inner peripheral space of the connector housing 14. The electric shock prevention cap 58 is made of electrically insulating synthetic resin or the like, and structured to cover the tip surface and both vertical side surfaces of the terminal body portions 34 by being mounted on a tip part of the terminal body portion 34. The electric shock prevention cap 58 has such an integrated structure that parts to be mounted on a pair of the terminal body portions 34, 34 are coupled to each other, and is mountable collectively on the terminal fittings 16, 16. The electric shock prevention cap 58 is disposed to cover a space between the terminal body portion 34 facing each other from front, whereby the insertion of a finger or jig into the space between the terminal body portions 34 facing each other can be prevented. Further, the electric shock prevention cap 58 also has parts for covering spaces between the terminal body portions 34, 34 and the connector housing 14 facing each other from front, and the insertion of a finger or jig into the spaces between the terminal body portions 34, 34 and the connector housing 14 facing each other is also prevented by the electric shock prevention cap 58. Note that the electric shock prevention cap 58 is not shown in FIG. 3 for visibility.

<Wires 60>

As shown in FIG. 2, a wire 60 is connected to the wire connecting portion 50 of the terminal fitting 16. The wire 60 is such an insulated wire that a core wire made of electrically conductive metal is covered around by an electrically insulating synthetic resin or the like. A crimping terminal 62 is conductively fixed to an end part of the core wire exposed from an insulation coating in the wire 60 by a means such as crimping. The crimping terminal 62 includes a wire fixing portion 64 in the form of a flat tube and a plate-like connecting portion 66 projecting from the wire fixing portion 64, and the plate-like connecting portion 66 is formed with a bolt hole 68 penetrating in a thickness direction. The crimping terminal 62 is fixed to the wire connecting portion 50 of the terminal fitting 16 by a bolt 70 inserted through the bolt holes 54, 68 and a nut 72. In this way, the wire 60 is conductively connected to the terminal fitting 16. The terminal fitting 16 is connected to an end part of the wire 60 without via a resiliently deformable member such as a braided body, and fixedly positioned.

<Mating Connector 74>

Figure 11:
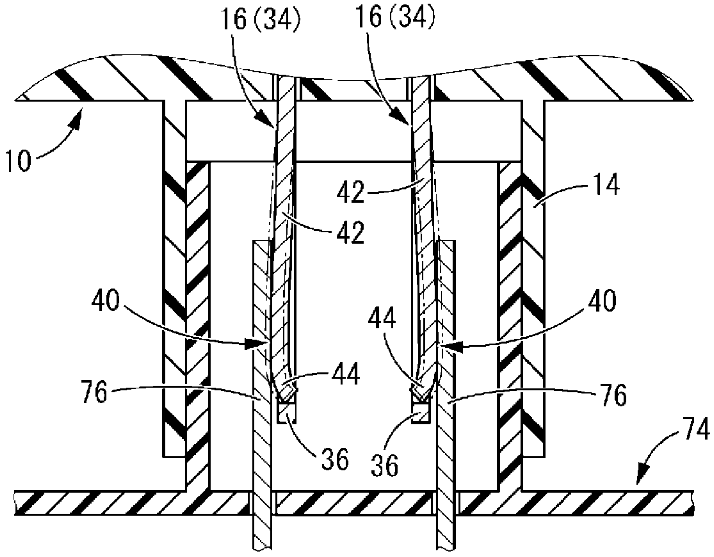
FIG. 11 is a section schematically showing a connected state of the high-voltage connector shown in FIG. 1, and a mating connector.

The mating connector 74 includes a pair of the mating terminals 76, 76 (see FIG. 11). The mating terminals 76, 76 are respectively in the form of flat plates and provided side by side in the lateral direction while being spaced apart to enable the insertion of the terminal body portions 34.

<Connection of High-Voltage Connector 10 and Mating Connector 74>

As shown in FIG. 11, the high-voltage connector 10 is connected to the mating connector 74 by fitting the mating connector 74 into the inner periphery of the connector housing 14. The high-voltage connector 10 and the mating connector 74 are fixedly positioned each other in a connected state. With the high-voltage connector 10 and the mating connector 74 connected, the terminal body portions 34, 34 of the high-voltage connector 10 and the mating terminals 76, 76 are overlapped in the plate thickness direction while contacting each other. Note that the structures of the high-voltage connector 10 and the mating connector 74 are simplified and schematically shown for visibility in FIG. 11.

That is, the resilient contact portion 38 of the terminal body portion 34 projects outward in the lateral direction, which is the plate thickness direction, with respect to the frame-like portion 36, and the mating terminal 76 overlapped on the lateral outer surface of the terminal body portion 34 contacts the top part 40 of the resilient contact portion 38. In this way, the resilient contact portion 38 of the terminal body portion 34 is pushed by the mating terminal 76 and resiliently deformed to decrease an angle of inclination with respect to the frame-like portion 36. A tilting degree of the resilient contact portion 38 with respect to the frame-like portion 36 changes according to relative positions of the terminal body portion 34 and the mating terminal 76 in the lateral direction. Therefore, even if an error occurs in the relative positions of the terminal body portion 34 and the mating terminal 76 in the lateral direction, the resilient contact portion 38 of the terminal body portion 34 is resiliently pressed against the mating terminal 76 and the contact state of the terminal body portion 34 and the mating terminal 76 is stably realized. Note that the terminal body portion 34 in a single state where the resilient contact portion 38 is not in contact with the mating terminal 76 is shown by a two-dot chain line in FIG. 11.

As just described, since the terminal body portion 34 is provided with the resilient contact portion 38 allowed to be resiliently deformed and deflected, the contact state of the terminal body portion 34 and the mating terminal 76 is stably realized by a simple structure having a small number of components. Further, the resilient contact portion 38 allowed to be resiliently deformed and deflected is formed as an integrated structure with the frame-like portion 36 by cutting and raising, and a resistance increase caused by connecting two components cannot occur between the resilient contact portion 38 and the frame-like portion 36. Therefore, excellent conductive performance is realized and a reduction of heat generated and the like caused by energization are achieved.

Further, by providing the terminal body portion 34 with the resilient contact portion 38, the terminal body portion 34 to be connected to the mating terminal 76 in the form of a flat plate does not have a tubular shape as in the conventional female terminal, but has a flat plate shape. Since the structure of the terminal body portion 34 is simplified in this way, low cost and easy manufacturing of the terminal fitting 16, the size reduction of the high-voltage connector 10 by narrowing the accommodation space for the terminal fittings 16, and the like can be achieved.

By providing the first inclined portion 42, the top part 40 of the resilient contact portion 38 projects more toward the mating terminal 76 than the frame-like portion 36 in the plate thickness direction, the mating terminal 76 contacts the resilient contact portion 38 of the terminal body portion 34 and the connection of the mating terminal 76 and the terminal body portion 34 is stably realized. Further, by providing a second inclined portion 44 in a front part of the resilient contact portion 38, the mating terminal 76 is guided along the surface of the second inclined portion 44 in inserting the mating terminal 76 from front to rear of the terminal body portion 34. Therefore, the mating terminal 76 is unlikely to be caught on the resilient contact portion 38, the high-voltage connector 10 and the mating connector 74 are smoothly connected and the mating terminal 76 is inserted up to a proper connection position with respect to the terminal body portion 34.

Since the resilient contact portion 38 of the terminal body portion 34 is resiliently brought into contact and conduction with the mating terminal 76, it is not necessary to allow a displacement of the terminal fitting 16 with respect to the wire 60 by interposing a resiliently deformable member such as a braided body between the terminal fitting 16 and the wire 60. Therefore, tolerances of the relative positions of the terminal body portion 34 and the mating terminal 76 are allowed by a simple structure having a small number of components, and the stable connection of the terminal body portion 34 and the mating terminal 76 is realized by the simple structure.

Second Embodiment

Figure 12:
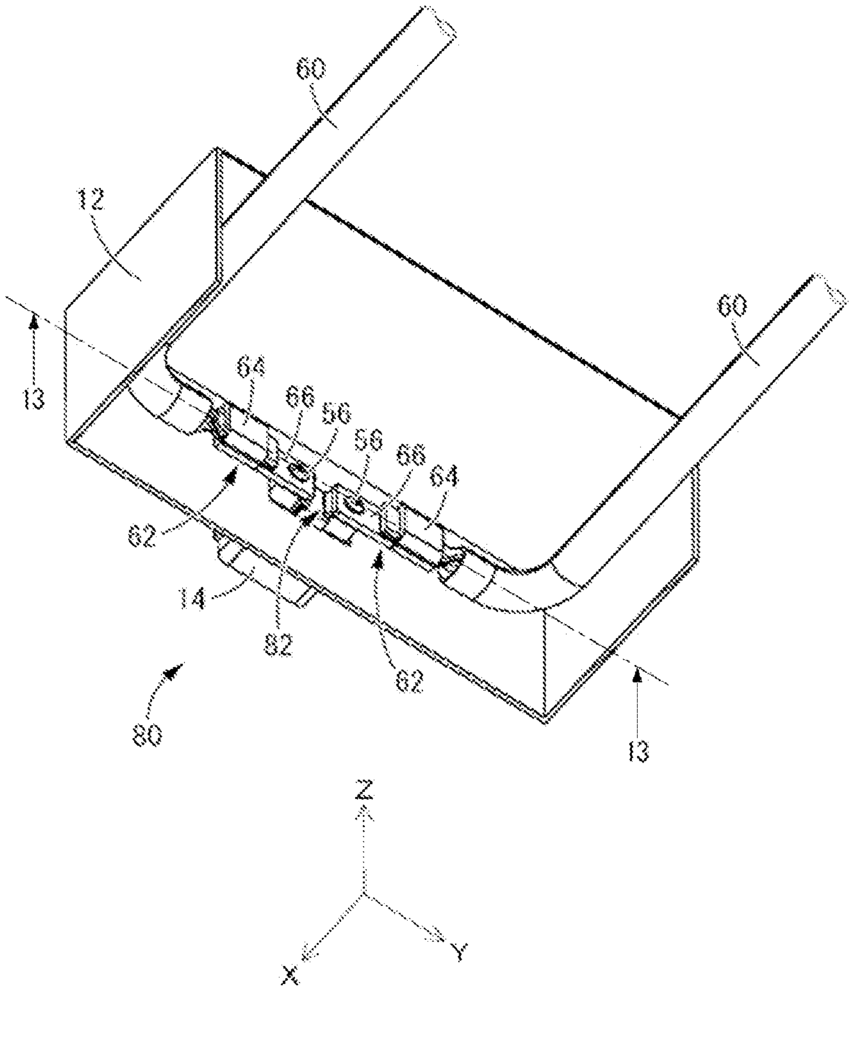
FIG. 12 is a perspective view of a high-voltage connector according to a second embodiment.
Figure 13:
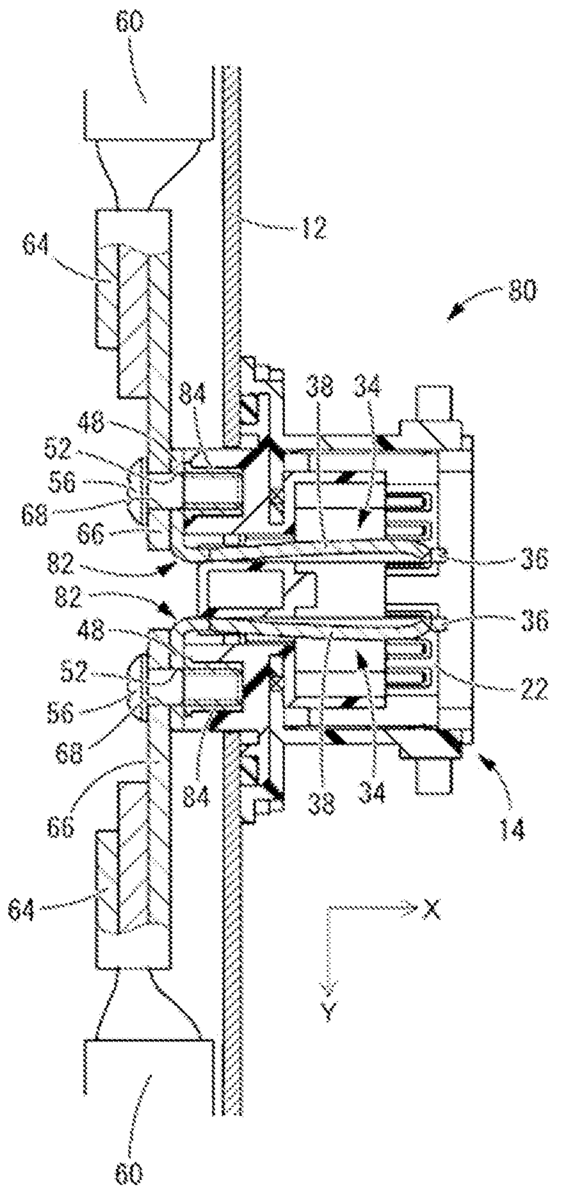
FIG. 13 is a section enlargedly showing a part of the high-voltage connector shown in FIG. 12.

FIGS. 12 and 13 show a second embodiment of the present disclosure. A high-voltage connector 80 includes a pair of terminal fittings 82, 82. In the following description, substantially the same members and parts as those of the first embodiment are denoted by the same reference signs in figures and are not described.

Unlike the terminal fitting 16 of the first embodiment, the terminal fitting 82 has a structure not including the wire connecting portion 50, and is composed of a terminal body portion 34 and a fixing portion 48. The fixing portion 48 of the terminal fitting 82 is overlapped on the rear surface of a connector housing 14, and a plate-like connecting portion 66 of a crimping terminal 62 provided on an end part of a wire 60 is overlapped on the rear surface of the fixing portion 48. A bolt 56 as a fixing member is inserted through a bolt hole 52 of the terminal fitting 82 and a bolt hole 68 of the crimping terminal 62, and threadably inserted into a nut portion 84 of the connector housing 14. In this way, the terminal fitting 82 and the crimping terminal 62 fixed to the wire 60 are collectively fixed substantially at the same position with respect to the connector housing 14. The fixing portion 48 of the terminal fitting 82 and the plate-like connecting portion 66 of the crimping terminal 62 fixed to the connector housing 14 by the bolt 56 contact and overlap each other, and the terminal fitting 82 and the wire 60 are brought into conduction with each other. Note that the crimping terminal 62 may be arranged to be located between the connector housing 14 and the fixing portion 48 of the terminal fitting 82, in other words, to be overlapped on the front surface of the fixing portion 48. The fixing member for collectively fixing the terminal fitting 82 and the crimping terminal 62 provided on the wire 60 to the connector housing 14 is not limited to the bolt 56 and may be, for example, a pin, an alloy for brazing or the like.

According to such a second embodiment, since the wire 60 and the terminal fitting 82 are collectively fixed to the connector housing 14, an input from the side of the wire 60 to the side of the terminal fitting 82 is immediately transferred to and received by the connector housing 14 and is unlikely to be transferred to the terminal body portion 34 of the terminal fitting 82. Further, since a moment based on an input from the wire 60 is unlikely to act on the terminal fitting 82 as compared to the case where the fixed position of the terminal fitting 82 to the connector housing 14 and the fixed position of the wire 60 to the terminal fitting 82 are different, a swing and a positional deviation of the terminal fitting 82 are prevented.

Third Embodiment

Figure 14:
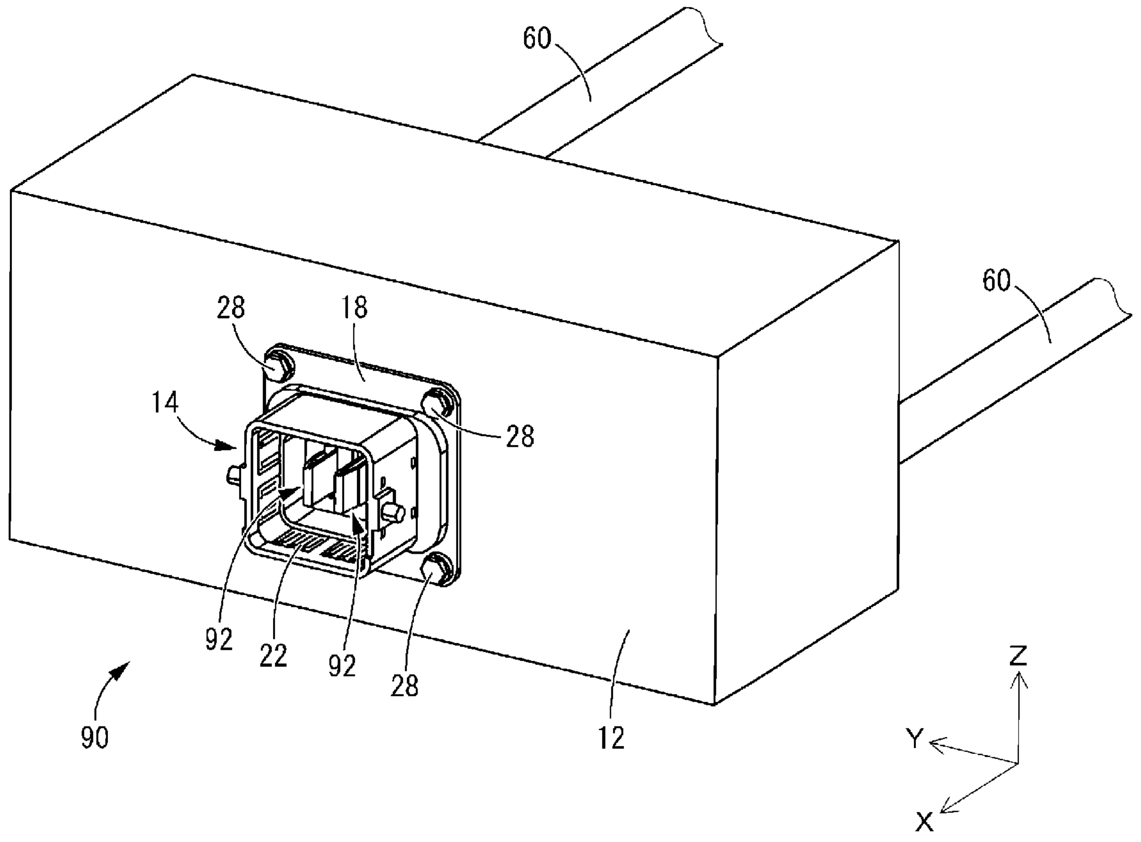
FIG. 14 is a perspective view of a high-voltage connector according to a third embodiment.

FIG. 14 shows a third embodiment of the present disclosure. A high-voltage connector 90 includes a pair of terminal fittings 92, 92. Note that since the pair of terminal fittings 92, 92 are shaped plane-symmetrically with each other, only one terminal fitting 92 is described as in the first embodiment.

Figure 15:
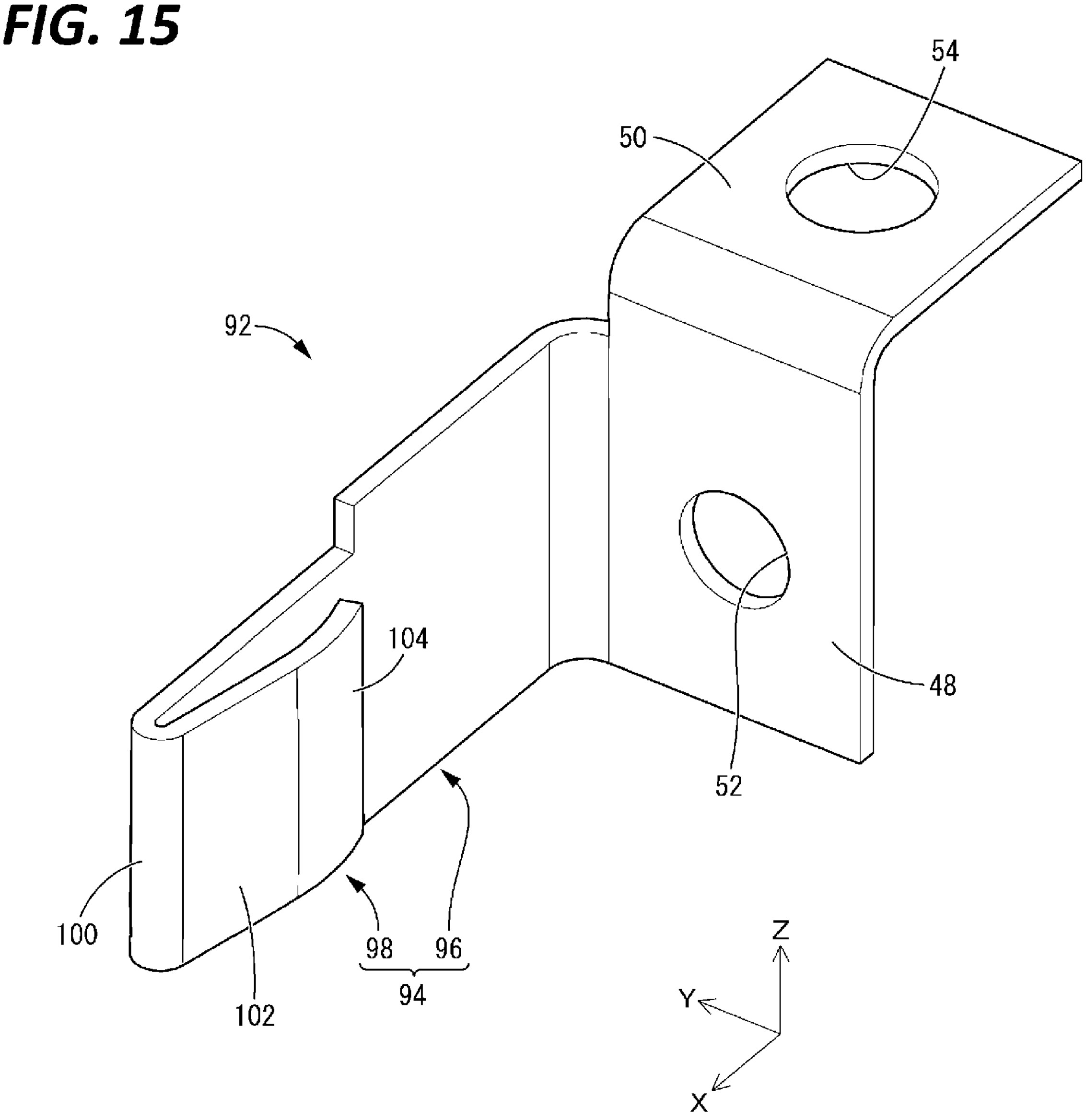
FIG. 15 is a perspective view of a terminal fitting constituting the high-voltage connector shown in FIG. 14.
Figure 16:
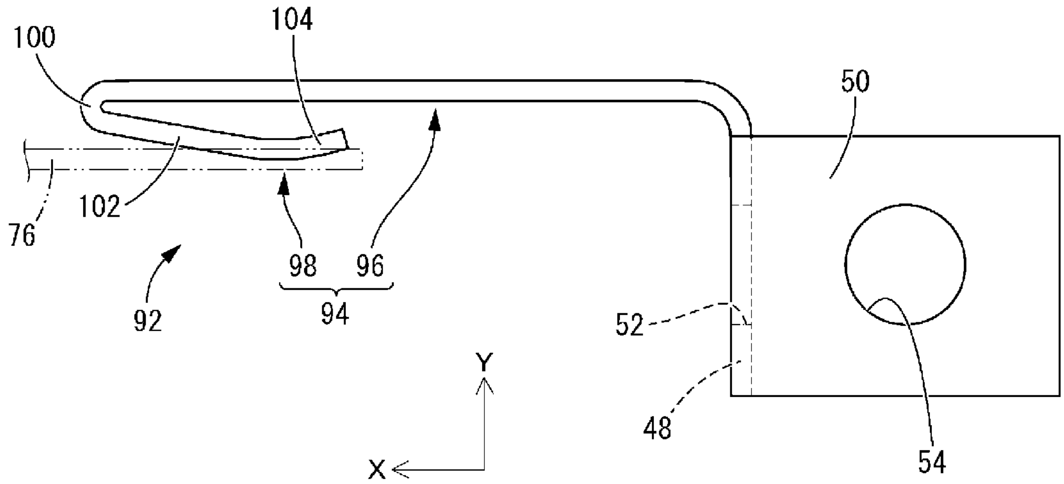
FIG. 16 is a plan view of the terminal fitting shown in FIG. 15.

The terminal fitting 92 is made of an electrically conductive metal material. As shown in FIGS. 15 and 16, the terminal fitting 92 includes a plate-like terminal body portion 94. A fixing portion 48 and a wire connecting portion 50 are integrally provided on a base end side (rear side) of the terminal body portion 94. The terminal body portion 94 includes a flat plate-like portion 96 extending forward from the fixing portion 48 and a resilient contact portion 98 extending on the tip of the flat plate-like portion 96. A width of the flat plate-like portion 96 in a vertical direction (Z direction and direction opposite to the Z direction in FIG. 15) changes in two steps, and a tip side is narrower than the base end side. Note that the terminal fitting 92 can be, for example, obtained by press-working a plate made of electrically conductive metal.

The resilient contact portion 98 is provided with a curved folded portion 100 on the tip of the flat plate-like portion 96, which is the tip of the terminal body portion 94, and formed by folding the terminal body portion 94 at the folded portion 100 to extend toward the base end side. Accordingly, the terminal body portion 94 has a double structure on a tip part in which the resilient contact portion 98 and the flat plate-like portion 96 are facing each other while being separated from each other in a plate thickness direction. The resilient contact portion 98 is facing a tip part of the flat plate-like portion 96 having a small vertical width, and does not reach a base end part having a large vertical width.

The base end of the resilient contact portion 98 is integrally coupled to the folded portion 100, and a tip part of the resilient contact portion 98 serves as a third inclined portion 102. The third inclined portion 102 is inclined outward in a lateral direction (opposite to a Y direction in FIG. 15) to an overlapping side with a mating terminal 76 (see FIG. 16) toward the base end of the terminal body portion 94. That is, the resilient contact portion 98 is in the form of a leaf spring resiliently deformable in a plate thickness direction to be cantilevered and inclined to the overlapping side with the mating terminal 76. In this way, the resilient contact portion 98 provided by folding can be provided with good manufacturability. The tip part of the resilient contact portion 98 constituted by the third inclined portion 102 is separated more from the flat plate-like portion 96 from the folded portion 100 toward the base end side and largely projects outward in the lateral direction toward the base end side.

An end part of the resilient contact portion 98 on the base end side of the terminal body portion 94 serves as a fourth inclined portion 104. The fourth inclined portion 104 is inclined to an inner side in the lateral direction (Y direction in FIG. 15), which is a side opposite to the overlapping side with the mating terminal 76, toward the base end side of the terminal body portion 94. The end part of the resilient contact portion 98 on the base end side of the terminal body portion 94 constituted by the fourth inclined portion 104 comes closer to the flat plate-like portion 96 toward the base end side of the terminal body portion 94 and a facing distance between the fourth inclined portion 104 and the flat plate-like portion 96 is minimum at an end part of the fourth inclined portion 104 on the base end side of the terminal body portion 94. Accordingly, the resilient contact portion 98 is constituted by the third and fourth inclined portions 102, 103 continuous with each other, and an outward projecting amount in the lateral direction is maximum at a boundary part between the end part of the third inclined portion 102 on the base end side of the terminal body portion 94 and a tip part of the fourth inclined portion 104 on the tip side of the terminal body portion 94. The fourth inclined portion 104 has a shorter length than the third inclined portion 102 and deflection by bending in the plate thickness direction is suppressed. Note that the mating terminal 76 is virtually shown by a two-dot chain line in FIG. 16. The mating terminal 76 is inserted from the tip side of the terminal body portion 94 while pushing the resilient contact portion 98 inward in the lateral direction, and overlapped in contact with the resilient contact portion 98.

A lateral distance between the fourth inclined portion 104 and the flat plate-like portion 96 is set according to an angle change allowed for the third inclined portion 102 in a contact state of the resilient contact portion 98 and the mating terminal 76. That is, when the resilient contact portion 98 is pushed laterally inward by the mating terminal 76, the base end of the fourth inclined portion 104 abuts on the flat plate-like portion 96, thereby limiting a laterally inward displacement amount of the resilient contact portion 98 and limiting the angle change of the third inclined portion 102. Note that, in a state where the resilient contact portion 98 is not in contact with the mating terminal 76, the base end of the fourth inclined portion 104 may be separated from the flat plate-like portion 96 or may be in contact with the flat plate-like portion 96.

However, the fourth inclined portion 104 is not essential and, for example, the entire resilient contact portion may be constituted by the third inclined portion 102. A part of the third inclined portion 102 substantially parallel to the flat plate-like portion 96 may be provided on the base end side of the terminal body portion 94 to increase a contact area of the resilient contact portion with the mating terminal 76.

According to the high-voltage connector 90 including the terminal fittings 92, 92 structured according to this embodiment, the contact state with the mating terminal 76 can be stably obtained by the resilient contact portion 98 of a simple structure formed by folding.

Further, by providing the folded portion 100 folded into a curved shape on the tip part of the terminal body portion 94, the mating terminal 76 is unlikely to be caught on the tip part of the terminal body portion 94 and smoothly guided to an overlapping side with the resilient contact portion 98 when the mating terminal 76 is inserted from the tip side with respect to the terminal body portion 94. Moreover, the tip part of the resilient contact portion 98 continuous with the folded portion 100 serves as the third inclined portion 102, and the terminal body portion 94 has a lateral width reduced toward the tip in a part where the resilient contact portion 98 is formed. In this way, the contact state with the mating terminal 76 can be stably realized while the mating terminal 76 inserted from the tip side is prevented from being caught on the terminal body portion 94.

The resilient contact portion 98 is inclined to the overlapping side with the mating terminal 76 toward the base end of the terminal body portion 94 and projects toward the mating terminal 76 in the third inclined portion 102. Therefore, when the mating terminal 76 is inserted from the tip side of the terminal body portion 94 and overlapped on the resilient contact portion 98, the resilient contact portion 98 projecting toward the mating terminal 76 stably contacts the mating terminal 76.

Further, an approaching displacement amount of the resilient contact portion 98 to the flat plate-like portion 96, accompanied by a change of an angle of inclination of the third inclined portion 102, is limited by the abutment of the end part of the fourth inclined portion 104 on the base end side of the terminal body portion 94 on the flat plate-like portion 96. Therefore, excessive deformation of the folded portion 100 is prevented and plastic deformation of the folded portion 100 is prevented. As a result, such as when the high-voltage connector 90 and an unillustrated mating connector are repeatedly connected and disconnected, the contact state of the resilient contact portion 98 of the terminal body portion 94 and the mating terminal 76 is stable.

Further, an edge of the resilient contact portion 98 on the base end side of the terminal body portion 94 is separated from a contact position with the mating terminal 76 in an overlapping direction with the mating terminal 76 by the fourth inclined portion 104. This avoids the damage such as galling of the mating terminal 76 and the like by the contact of the edge of the resilient contact portion 98 one the base end side of the terminal body portion 94 with the mating terminal 76.

Fourth Embodiment

Figure 17:
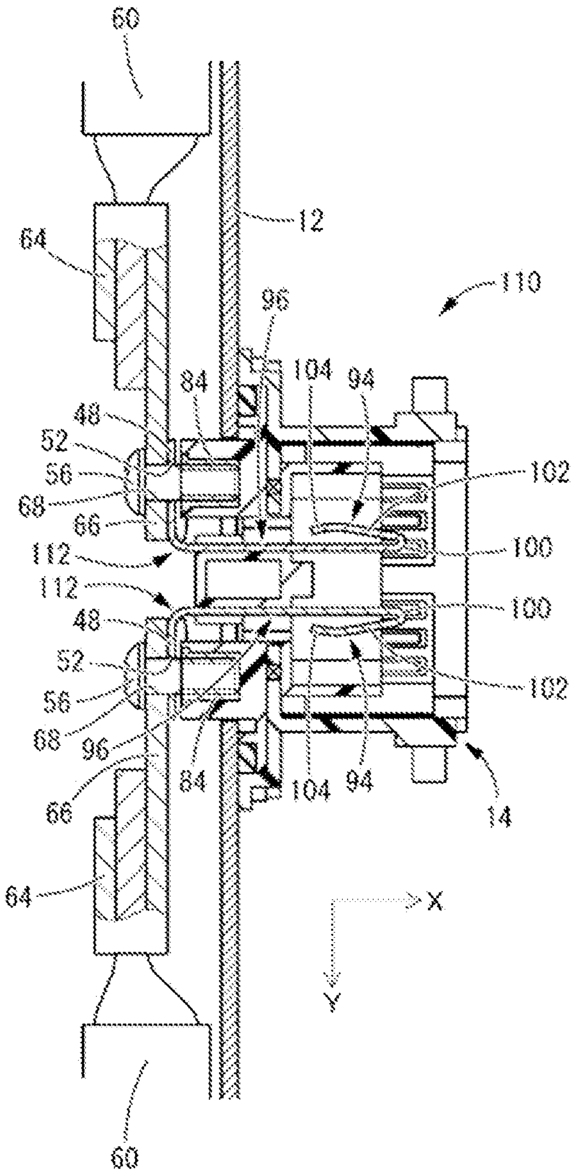
FIG. 17 is a section enlargedly showing a part of a high-voltage connector according to a fourth embodiment.
Figure 18:
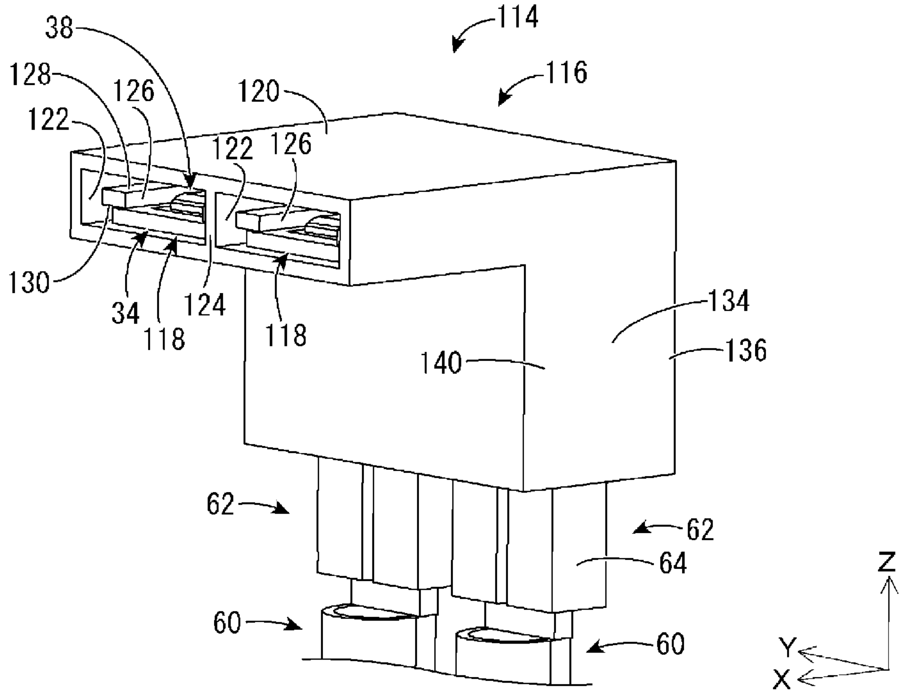
FIG. 18 is a perspective view of a high-voltage connector according to a fifth embodiment.
Figure 19:
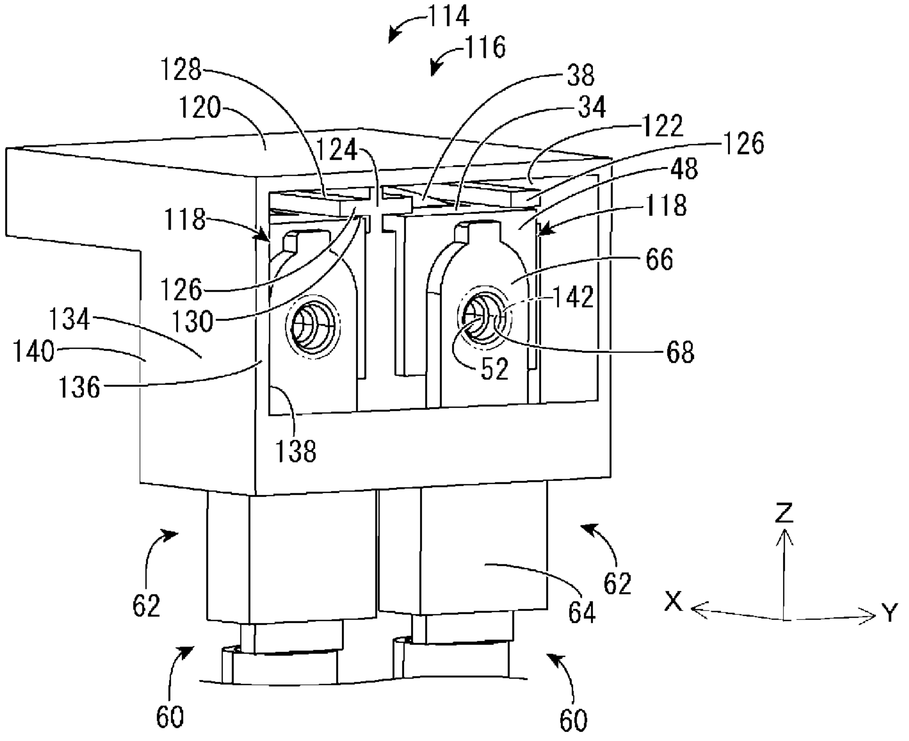
FIG. 19 is a perspective view showing the high-voltage connector shown in FIG. 18 when viewed from another direction.
Figure 24:
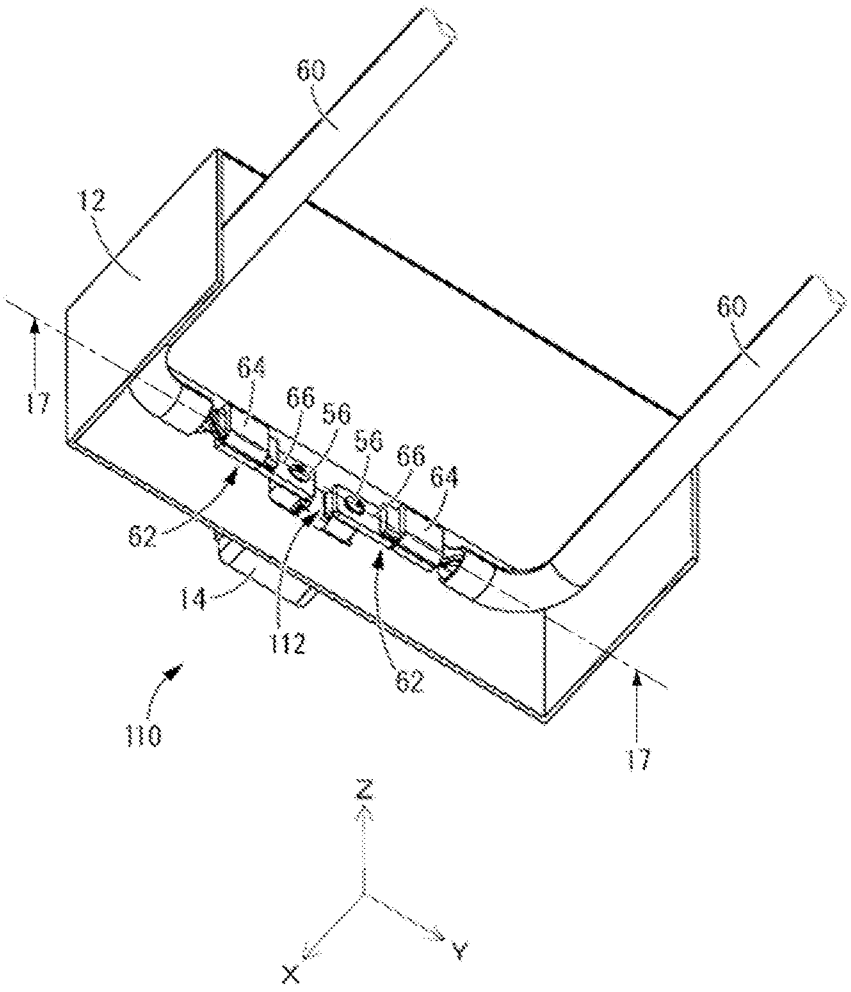
FIG. 24 is a perspective view of a high-voltage connector according to a fourth embodiment.

FIGS. 17 and 24 illustrate a fourth embodiment of the present disclosure. A high-voltage connector 110 includes a pair of terminal fittings 112, 112.

Unlike the terminal fitting 92 of the third embodiment, the terminal fitting 112 has a structure not including the wire connecting portion 50, and is composed of a terminal body portion 94 and a fixing portion 48. The fixing portion 48 of the terminal fitting 112 is overlapped on the rear surface of a connector housing 14, and a plate-like connecting portion 66 of a crimping terminal 62 provided on an end part of a wire 60 is overlapped on the rear surface of the fixing portion 48. A bolt 56 as a fixing member is inserted through a bolt hole 52 of the terminal fitting 112 and a bolt hole 68 of the crimping terminal 62, and threadably inserted into a nut portion 84 of the connector housing 14. In this way, the terminal fitting 112 and the crimping terminal 62 fixed to the wire 60 are collectively fixed substantially at the same position with respect to the connector housing 14. The fixing portion 48 of the terminal fitting 112 and the plate-like connecting portion 66 of the crimping terminal 62 fixed to the connector housing 14 by the bolt 56 contact and overlap each other, and the terminal fitting 112 and the wire 60 are brought into conduction with each other. Note that the crimping terminal 62 may be arranged to be located between the connector housing 14 and the fixing portion 48 of the terminal fitting 112, in other words, to be overlapped on the front surface of the fixing portion 48.

According to such a fourth embodiment, an input from the side of the wire 60 to the side of the terminal fitting 112 is immediately transferred to and received by the connector housing 14 and is unlikely to be transferred to the terminal body portion 94 of the terminal fitting 112. Further, a moment based on an input from the wire 60 is unlikely to act on the terminal fitting 112, and a swing and a positional deviation of the terminal fitting 112 are prevented.

Fifth Embodiment

FIGS. 18 to 23 show a fifth embodiment of the present disclosure. A high-voltage connector 114 is structured such that a pair of terminal fittings 118, 118 are mounted in a connector housing 116 to be fixed to a case of an unillustrated device. In the following description, substantially the same members and parts as those of the first embodiment are denoted by the same reference signs in figures and are not described.

<Connector Housing 116>

Figure 20:
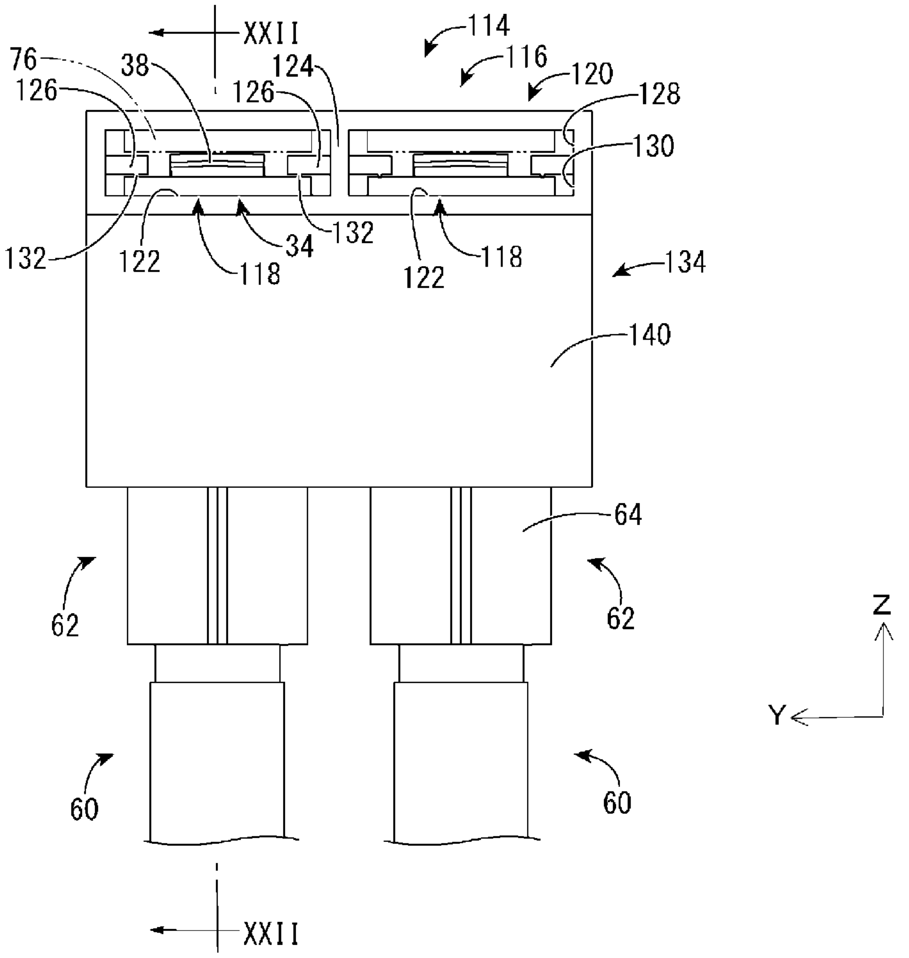
FIG. 20 is a front view of the high-voltage connector shown in FIG. 18.
Figure 21:
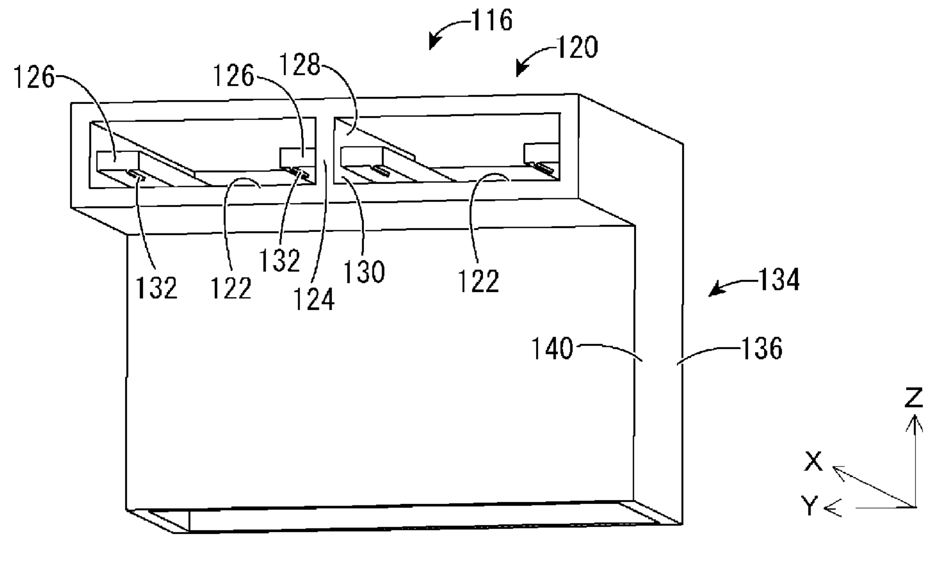
FIG. 21 is a perspective view showing a connector housing shown in FIG. 18 when viewed from another direction.

The connector housing 116 is, for example, made of electrically insulating synthetic resin or the like. The connector housing 116 is in the form of a rectangular tube bent into an L shape as a whole and open forward and downward. A front tube portion 120 of the connector housing 116 open forward is provided with a separation wall 124 in the form of a flat plate extending in a front-rear direction (X direction and direction opposite to the X direction), dividing the front tube portion 120 into two in a lateral direction (Y direction and direction opposite to the Y direction) and defining a pair of terminal insertion holes 122, 122 having a flat rectangular shape. Each terminal insertion hole 122 includes a pair of partition plates 126, 126 located in a vertically central part and projecting inward from both side surfaces. A space located above the pair of partition plates 126, 126 serves as a mating terminal insertion portion 128 into which a mating terminal 76 is inserted, and a space located below the pair of partition plates 126, 126 serves as a terminal body portion accommodating portion 130 into which a terminal body portion 34 is accommodated. For example, as shown in FIG. 20, the resilient contact portion 38 is arranged to project and be capable of contacting the mating terminal 76 between facing surfaces of the pair of partition plates 126, 126. Further, for example, as shown in FIG. 21, each of the pair of partition plates 126, 126 includes a tapered pressing rib 132 provided on a lower surface, projecting toward the lower inner surface of the terminal body portion accommodating portion 130 and extending rearward from a front end part.

A rear wall portion 136 of a rear tube portion 134 of the connector housing 116 open downward is formed with a cut portion 138 cut over an entire surface except a lower end part. A nut portion 84 which is open rearward in a central part and into which a bolt 142 is threadably inserted is provided in the rear surface of a front wall portion 140 of the rear tube portion 134 of the connector housing 116 (see FIG. 22). Note that the bolt 142 is shown by a virtual line to facilitate understanding.

Figure 22:
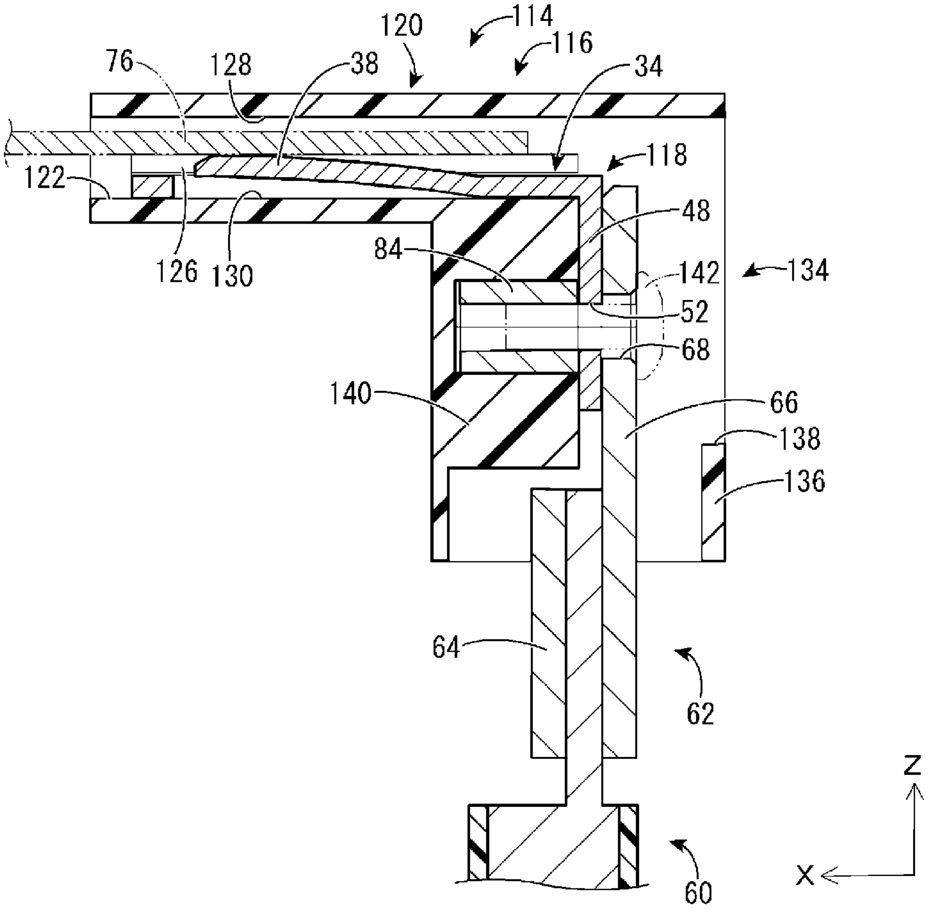
FIG. 22 is an enlarged section along XXII-XXII in FIG. 20.
Figure 23:
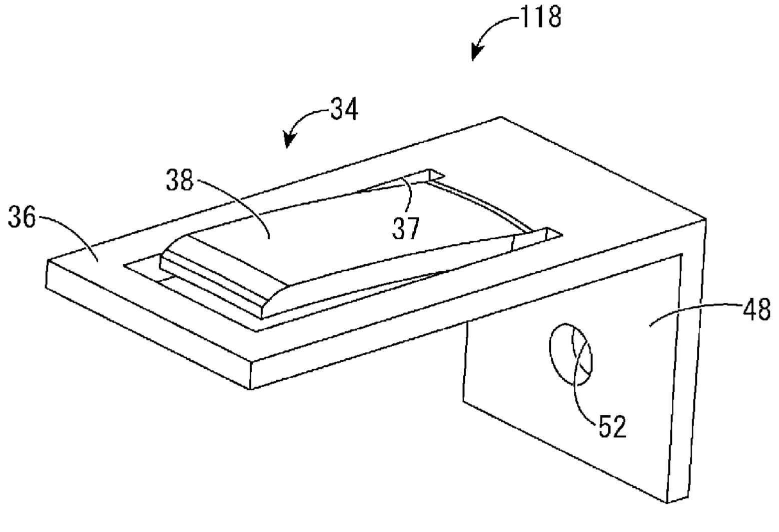
FIG. 23 is a perspective view of a terminal fitting constituting the high-voltage connector shown in FIG. 18.

Unlike the terminal fitting 16 of the first embodiment, the terminal fitting 118 has a structure not including the wire connecting portion 50, and is composed of a terminal body portion 34 and a fixing portion 48 as shown in FIG. 23. As shown in FIG. 22, the fixing portion 48 of the terminal fitting 118 extends downward in the vertical direction from the base end of the terminal body portion 34 and is overlapped on the rear surface of the connector housing 116. Further, a plate-like connecting portion 66 of a crimping terminal 62 provided on an end part of a wire 60 is overlapped on the rear surface of the fixing portion 48. A bolt 142 as a fixing member is inserted through a bolt hole 52 of the terminal fitting 118 and a bolt hole 68 of the crimping terminal 62, and threadably inserted into the nut portion 84 of the connector housing 116. In this way, the terminal fitting 118 and the crimping terminal 62 fixed to the wire 60 are collectively fixed substantially at the same position with respect to the connector housing 116. The fixing portion 48 of the terminal fitting 118 and the plate-like connecting portion 66 of the crimping terminal 62 bolt-fastened to the connector housing 116 contact and overlap each other, and the terminal fitting 118 and the wire 60 are brought into conduction with each other.

In this way, the terminal body portion 34 of the terminal fitting 118 extends along an axial direction (X direction) of the terminal body portion accommodating portion 130, and the terminal fitting 118 is so accommodated into the connector housing 116 that a plate thickness direction of the terminal body portion 34 is a vertical direction of the terminal insertion hole 122. Further, the pressing ribs 132 press a tip part of the terminal body portion 34 toward the lower inner surface of the terminal body portion accommodating portion 130.

According to the fifth embodiment as just described, the terminal fitting 118 is so accommodated into the connector housing 116 that the plate thickness direction of the terminal body portion 34 is the vertical direction of the terminal insertion hole 122. Thus, a height reduction of the connector housing 116 itself can be advantageously achieved as compared to the case where the vertical direction of the terminal insertion hole 122 of the connector housing 116 is a plate width direction of the terminal body portion 34. Further, the terminal body portion 34 and the mating terminal 76 can be accommodated and held in a connectable state in a smaller space by a simple structure of providing the pair of partition plates 126, 126 projecting inward from the both side surfaces of the terminal insertion hole 122. Furthermore, since the high-voltage connector 114 includes the pair of terminal fittings 118, 118, the high-voltage connector 114 can be advantageously fit and connected to a mating connector mating terminal including terminals arranged in parallel while being spaced apart by a certain distance in the plate width direction.

In addition, according to this embodiment, the tip part of the terminal body portion 34 provided on a side opposite to the fixing portion 48 of the L-shaped terminal fitting 118 may be lifted up by fixing the fixing portion 48 and the connector housing 116. However, the tip part of the terminal body portion 34 can be pressed toward the lower inner surface by the pressing ribs 132 provided on the lower surfaces of the partition plates 126 of the terminal insertion hole 122 of the connector housing 116. Therefore, the lift-up of the tip part of the terminal body portion 34 can be prevented and the L-shaped terminal fitting 118 can be stably positioned and held at a desired position with respect to the connector housing 116.

Other Embodiments

The technique described in this specification is not limited to the above described and illustrated embodiments. For example, the following embodiments are also included in the technical scope of the technique described in this specification.

(1) Although the high-voltage connector 10 including the pair of terminal fittings 16, 16 is illustrated in the first embodiment, the number of terminal fitting(s) in a high-voltage connector may be one, three or more. Further, in the case of providing a pair of terminal fittings or three or more terminal fittings, those terminal fittings may be different in shape and size from each other. For example, the terminal fittings 16 of the first embodiment and the terminal fittings 92 of the third embodiment may be adopted in combination.

(2) Although the resilient contact portion 38 is formed by cutting and raising with the rear end side of the terminal body portion 34 as the base end in the first embodiment, the resilient contact portion 38 can also be formed, for example, by cutting and raising with a front end side of the terminal body portion 34 as a base end. In short, a free end of the resilient contact portion 38 may be located on either of the tip side and base end side of the terminal body portion 34 and it is easily avoided that the mating terminal 76 butts against the terminal body portion 34 to be caught by the resilient contact portion 38 if the free end of the resilient contact portion 38 is located on the base end side of the terminal body portion 34.

(3) The resilient contact portion 38 may not necessarily be provided in an intermediate part of the terminal body portion and can be, for example, provided on an end part in the width direction (vertical direction of the first to fourth embodiments and lateral direction of the fifth embodiment) of the terminal body portion.

(4) A plurality of the resilient contact portions 38 may be provided in one terminal body portion 34. In that case, the shapes, sizes and the like of the plurality of resilient contact portions 38 may be different from each other.

(5) The resilient contact portion 38 needs not be entirely inclined with respect to the frame-like portion 36 and may have, for example, a part extending substantially in parallel to the frame-like portion 36.

(6) In the first embodiment, the mating terminals 76, 76 are overlapped on the laterally outer surfaces of the terminal body portions 34, 34 by connecting the high-voltage connector 10 and the mating connector 74. However, the mating terminals 76, 76 may be inserted between the terminal body portions 34, 34 laterally facing each other and overlapped on the inner surfaces of the terminal body portions 34, 34. In this case, the resilient contact portion 38 of the first embodiment is cut and raised to project inward, i.e. toward a side opposite to that of the first embodiment, in the plate thickness direction with respect to the frame-like portion 36. In short, an inclined part of the resilient contact portion is inclined to project to the overlapping side with the mating terminal 76.

(7) Although the high-voltage connector 10 and the mating connector 74 are connected by inserting the mating terminal 74 into the inner periphery of the high-voltage connector 10 in the first embodiment, the high-voltage connector 10 may be, for example, inserted into the inner periphery of the mating connector 74 for connection.

(8) Also in the fifth embodiment, the squeezable ribs 32 may be provided on the base end side of the terminal body portion accommodating portion 130 as in the first embodiment. In this way, the terminal body portion 34 is more stably accommodated and held in the terminal body portion accommodating portion 130.

LIST OF REFERENCE NUMERALS

10 high-voltage connector (first embodiment)
12 case
14 connector housing
16 terminal fitting
18 mounting piece
20 bolt hole
22 shield member
24 bottom surface
26 terminal insertion hole

28 bolt
30 sealing rubber
31 facing inner surface
32 squeezable rib
**32*a*** squeezable rib
**32*b*** squeezable rib
33 facing inner surface
34 terminal body portion
36 frame-like portion
37 slit
38 resilient contact portion
40 top part
42 first inclined portion
44 second inclined portion
46 recessed groove
48 fixing portion
50 wire connecting portion
52 bolt hole
54 bolt hole
56 bolt (fixing member)
58 electric shock prevention cap
60 wire
62 crimping terminal
64 wire fixing portion
66 plate-like connecting portion
68 bolt hole
70 bolt
72 nut
74 mating connector
76 mating terminal
80 high-voltage connector (second embodiment)
82 terminal fitting
84 nut portion
90 high-voltage connector (third embodiment)
92 terminal fitting
94 terminal body portion
96 flat plate-like portion
98 resilient contact portion
100 folded portion
102 third inclined portion
104 fourth inclined portion
110 high-voltage connector (fourth embodiment)
112 terminal fitting
114 high-voltage connector (fifth embodiment)
116 connector housing
118 terminal fitting
120 front tube portion
122 terminal insertion hole
124 separation wall
126 partition plate
128 mating terminal insertion portion
130 terminal body portion accommodating portion
132 pressing rib
134 rear tube portion
136 rear wall portion
138 cut portion
140 front wall portion
142 bolt (fixing member)

What is claimed is:

1. A high-voltage connector, comprising:

a terminal fitting including a terminal body portion in the form of a flat plate to be overlapped on a mating terminal in the form of a flat plate in a plate thickness direction; and a resilient contact portion integrally provided to the terminal body portion, the resilient contact portion being at least partially inclined to an overlapping side with the mating terminal, wherein:

the terminal fitting includes a fixing portion to be fixed to a connector housing having a terminal insertion hole into which the terminal body portion is inserted, a squeezable rib is provided to project from one facing inner surface of the terminal insertion hole toward another facing inner surface, the terminal body portion is sandwiched and positioned between the squeezable rib and the other facing inner surface, the fixing portion is provided to be continuous with a rear end of the terminal body portion and extends orthogonally to the terminal body portion, the resilient contact portion is provided by cutting and raising in the terminal body portion, the resilient contact portion is provided with a first inclined portion inclined to the overlapping side with the mating terminal toward a tip of the terminal body portion, a second inclined portion inclined to a side opposite to the overlapping side with the mating terminal toward the tip of the terminal body portion is provided on a side of the resilient contact portion closer to the tip than the first inclined portion, the resilient contact portion includes a top part where a projecting amount in the plate thickness direction from the frame-like portion is maximum, the first inclined portion is inclined to the overlapping side with the mating terminal in the plate thickness direction from the rear end of the resilient contact portion toward the top part, and the second inclined portion is inclined to a side opposite to the overlapping side with the mating terminal from the top part toward a front end of the resilient contact portion.

2. The high-voltage connector of claim 1, wherein the terminal body portion includes a frame-like portion constituting an outer peripheral end part and the resilient contact portion provided on an inner peripheral side of the frame-like portion via a slit, and the resilient contact portion is in the form of a leaf spring integrally coupled to the frame-like portion on a base end and resilient deformable in the plate thickness direction by being cut and raised to be cantilevered and inclined to the overlapping side with the mating terminal.

3. The high-voltage connector of claim 2, wherein the frame-like portion includes a recessed groove that is provided open in an upper or lower surface of the frame-like portion and penetrates through the frame-like portion in a lateral direction.

4. The high-voltage connector of claim 1, wherein the resilient contact portion is provided by folding on a tip of the terminal body portion.

5. The high-voltage connector of claim 4, wherein the terminal body portion includes a flat plate-like portion, a curved folded portion provided on a tip of the flat plate-like portion and the resilient contact portion extending from the folded portion toward a base end side, and the resilient contact portion is in the form of a leaf spring integrally coupled to the folded portion and resilient deformable in the plate thickness direction by being cantilevered and inclined to the overlapping side with the mating terminal.

6. The high-voltage connector of claim 5, wherein:

the resilient contact portion is provided with a third inclined portion inclined to the overlapping side with the mating terminal toward a base end of the terminal body portion opposite to a folded side of the resilient contact portion, and a fourth inclined portion inclined to a side opposite to the overlapping side with the mating terminal toward the base end of the terminal body portion is provided on a side of the resilient contact portion closer to the base end of the terminal body portion than the third inclined portion.

7. The high-voltage connector of claim 1, wherein:

an end part of a wire is connected to the terminal fitting at the fixing portion, and the high-voltage connector comprises a fixing member for collectively fixing the fixing portion, the connector housing and the end part of the wire.

8. The high-voltage connector of claim 1, wherein the terminal fitting is connected to an end of a wire without via a resilient deformable member.

9. The high-voltage connector of claim 1, wherein the terminal body portion is surrounded by a shield member.

10. The high-voltage connector of claim 1, wherein the terminal fitting further includes a wire connecting portion that is provided to be continuous with a rear end of the fixing portion and extends orthogonally to both the terminal body portion and the fixing portion.

11. A high-voltage connector, comprising:

a terminal fitting including a terminal body portion in the form of a flat plate to be overlapped on a mating terminal in the form of a flat plate in a plate thickness direction; and a resilient contact portion integrally provided to the terminal body portion, the resilient contact portion being at least partially inclined to an overlapping side with the mating terminal, wherein:

the terminal fitting includes a fixing portion to be fixed to a connector housing having a terminal insertion hole into which the terminal body portion is inserted, the terminal fitting is so accommodated into the connector housing that the plate thickness direction of the terminal body portion is a vertical direction of the terminal insertion hole, the terminal insertion hole has a flat rectangular shape and includes a pair of partition plates located in a central part in the vertical direction and projecting inward from both side surfaces, and a space located above the pair of partition plates serves as a mating terminal insertion portion, a space located below the pair of partition plates serves as a terminal body portion accommodating portion, and the resilient contact portion is arranged to project and be capable of contacting the mating terminal between facing surfaces of the pair of partition plates.

12. The high-voltage connector of claim 11, wherein:

the terminal body portion of the terminal fitting extends along an axial direction of the terminal body portion accommodating portion and the fixing portion of the terminal fitting extends downward in the vertical direction from a base end of the terminal body portion, and pressing ribs are provided on lower surfaces of the pair of partition plates, project toward a lower inner surface of the terminal body portion accommodating portion and press a tip part of the terminal body portion toward the lower inner surface.

* * * * *